United States Patent
Hwang et al.

(10) Patent No.: US 11,089,149 B2
(45) Date of Patent: *Aug. 10, 2021

(54) DISPLAY DEVICE AND OPERATING METHOD THEREOF

(71) Applicant: LG ELECTRONICS INC., Seoul (KR)

(72) Inventors: Soonhyung Hwang, Seoul (KR); Sijin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,310

(22) Filed: Mar. 16, 2020

(65) Prior Publication Data

US 2020/0220964 A1 Jul. 9, 2020

Related U.S. Application Data

(63) Continuation of application No. 16/344,609, filed as application No. PCT/KR2016/015042 on Dec. 21, 2016, now Pat. No. 10,630,833.

(30) Foreign Application Priority Data

Nov. 17, 2016 (KR) .......................... 10-2016-0153405

(51) Int. Cl.
*H04B 1/20* (2006.01)
*H04M 11/00* (2006.01)
*H04M 1/72466* (2021.01)
*H04W 4/80* (2018.01)
*H04W 8/00* (2009.01)

(52) U.S. Cl.
CPC ......... *H04M 1/72466* (2021.01); *H04W 4/80* (2018.02); *H04W 8/005* (2013.01)

(58) Field of Classification Search
CPC ........... H04M 1/7258; H04M 1/72533; H04M 11/007; H04B 1/202; H04B 5/0031; H04W 4/80; H04W 8/005; H04N 1/32723; H04N 1/32784; H04N 1/00403
See application file for complete search history.

(56) References Cited

U.S. PATENT DOCUMENTS

| | | | |
|---|---|---|---|
| 9,900,743 B2 * | 2/2018 | Reddy | ..................... H04W 4/10 |
| 10,630,833 B2 * | 4/2020 | Hwang | ............... G06F 16/9537 |
| 2008/0299905 A1 | 12/2008 | Kumar | |
| 2010/0069123 A1 | 3/2010 | Araradian et al. | |
| 2011/0313775 A1 | 12/2011 | Laligand et al. | |
| 2013/0110672 A1 | 5/2013 | Yang et al. | |
| 2013/0157632 A1 | 6/2013 | Moran | |
| 2014/0152899 A1 | 6/2014 | Newell | |

(Continued)

FOREIGN PATENT DOCUMENTS

| | | |
|---|---|---|
| KR | 10-2003-0080693 A | 10/2003 |
| KR | 10-2005-0058519 A | 6/2005 |

(Continued)

*Primary Examiner* — Andrew Wendell
(74) *Attorney, Agent, or Firm* — Birch, Stewart, Kolasch & Birch, LLP

(57) ABSTRACT

A display device includes a short-range communication unit to receive a search request signal from a mobile terminal and receive a voice signal from the mobile terminal after receiving the search request signal; and a display unit to display a result searched based on the voice signal.

20 Claims, 19 Drawing Sheets

(56) References Cited

U.S. PATENT DOCUMENTS

| | | | |
|---|---|---|---|
| 2015/0189391 A1* | 7/2015 | Lee | G06F 40/247 |
| | | | 725/61 |
| 2015/0379992 A1 | 12/2015 | Lee et al. | |
| 2016/0241806 A1* | 8/2016 | Ogle | H04N 21/42224 |
| 2016/0328206 A1 | 11/2016 | Nakaoka et al. | |
| 2016/0343345 A1* | 11/2016 | Moon | G06F 3/0346 |
| 2017/0125035 A1 | 5/2017 | Gao et al. | |
| 2018/0046702 A1 | 2/2018 | Jung et al. | |
| 2018/0286391 A1 | 10/2018 | Carey et al. | |
| 2019/0325079 A1 | 10/2019 | Blake et al. | |
| 2019/0355365 A1 | 11/2019 | Kim et al. | |

FOREIGN PATENT DOCUMENTS

| | | |
|---|---|---|
| KR | 10-2005-0107140 A | 11/2005 |
| KR | 10-2010-0091814 A | 8/2010 |
| KR | 10-2014-0055302 A | 5/2014 |
| KR | 10-2014-0067514 A | 6/2014 |

\* cited by examiner

DISPLAY DEVICE AND OPERATING METHOD THEREOF

CROSS-REFERENCE TO RELATED APPLICATIONS

This application is a Continuation of U.S. patent application Ser. No. 16/344,609 filed on Apr. 24, 2019, which is the National Phase of PCT International Application No. PCT/KR2016/015042 filed on Dec. 21, 2016, which claims the priority benefit under 35 U.S.C. § 119(a) to Korean Patent Application No. 10-2016-0153405 filed in the Republic of Korea on Nov. 17, 2016, all of which are hereby expressly incorporated by reference into the present application.

BACKGROUND OF THE INVENTION

Field of the Invention

The present invention relates to a display device and a method of operating the same.

Discussion of the Related Art

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In addition, a display device may also provide an Internet search service. In particular, an Internet search, which was previously provided on a computer, becomes possible on a display device. However, the display device has a disadvantage in that the manipulation such as inputting a search word or the like is not easy. In particular, when a user tries to search specific information while talking with a mobile terminal, it is difficult for the user to manipulate the manipulation.

Meanwhile, the display device is connected with a mobile terminal to transmit or receive data. The display device and the mobile terminal are connected with each other through a wired scheme or a wireless scheme to transmit or receive various signals. In particular, since power consumption is rapidly reduced through Bluetooth Low Energy (BLE), the display device and the mobile terminal may be always connected with each other. The display device is connected with the mobile terminal to receive a voice signal.

SUMMARY OF THE INVENTION

The present invention is to provide a display device and a method for operating the same, capable of receiving a voice signal from a mobile terminal, searching for information on talking content, and displaying a searched result.

According to an embodiment of to the present invention, a display device may include a short-range communication unit to receive a search request signal from a mobile terminal in a call, a control unit to obtain a connection state with the mobile terminal in response to receiving the search request signal, and to receive a voice signal from the mobile terminal if being in connected state with the mobile terminal, and a display unit to display a result searched based on the voice signal.

According to an embodiment of the present invention, the display device may further include a storage unit to store the result searched based on the voice signal, and the control unit may store the searched result in the storage unit or transmit the searched result to the mobile terminal.

According to an embodiment of the present invention, in the display device, the display unit may display a sharing menu including an item to be transmitted to a calling party and an item to be selected from contacts and to be transmitted, and the control unit may transmit the searched result to a party making the call with the mobile terminal or to any one of contacts stored in the mobile terminal, based on selected item from the sharing menu.

According to an embodiment of the present invention, in the display device, the control unit may obtain at least one search word by analyzing the voice signal and perform a web-browser search, a map search or a search on the mobile terminal by using the search word.

According to an embodiment of the present invention, in the display device, the control unit may split a screen displayed on the display unit into a plurality of areas and display a video, which is being viewed, and the searched result on the plurality of areas that are split.

According to an embodiment of the present invention, in the display device, the control unit may receive a user voice signal and a voice signal of a calling party and display the user voice signal and the voice signal of the calling party as captions, and display the searched result based on a selected caption when receiving a command for selecting any one of the captions.

According to an embodiment of the present invention, in the display device, the control unit may automatically store the searched result in the storage unit when the call is terminated.

According to an embodiment of the present invention, in the display device, the control unit may store the searched result by matching the searched result with a calling party.

According to an embodiment of the present invention, in the display device, the search request signal may be a voice signal including a preset keyword.

According to an embodiment of the present invention, in the display device, the control unit may turn on power of the display device and display that a search is possible in response to receiving the search request signal, when the power is turned off even through being in the connected state with the mobile terminal.

Advantageous Effects

According to various embodiments of the present invention, there may be provided a method allowing the user to easily search for specific information through the display device while talking on the phone. In detail, the search may be performed through the voice signal, thereby overcoming the difficulty that the user inputs the search word while talking on the phone.

According to various embodiments of the present invention, the information desired by the user may be provided through various searches using the voice signal.

According to various embodiments of the present invention, talking conversation may be checked through the caption while searching for the specific information.

According to various embodiments of the present invention, the searched result may be stored corresponding to the calling party, so information related to the calling party may be checked at a desired time point.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

The display device according to an embodiment of the present invention, which is an intelligent display device that adds a computer aid function to a broadcast receiving function, for example, and is equipped with a more convenient interface for, for example, a handwriting input device, a touchscreen, or a space remote control. In addition, the display device is connected with the Internet and a computer as a wired or wireless Internet function is supported. Accordingly, a function, such as an e-mail, a web browsing function, a banking function, or a game playing function, may be performed. For various functions, a standardized general-purpose OS may be used.

Therefore, the display device described in the present invention may perform various user-friendly functions since various applications are freely added or deleted on a general-purpose OS kernel. In more detail, the display device may include a network TV, an HBBTV, a smart TV, an LED TV, an OLED TV, or the like. Accordingly, the display device is applicable even to a smartphone if necessary.

Figure 1:
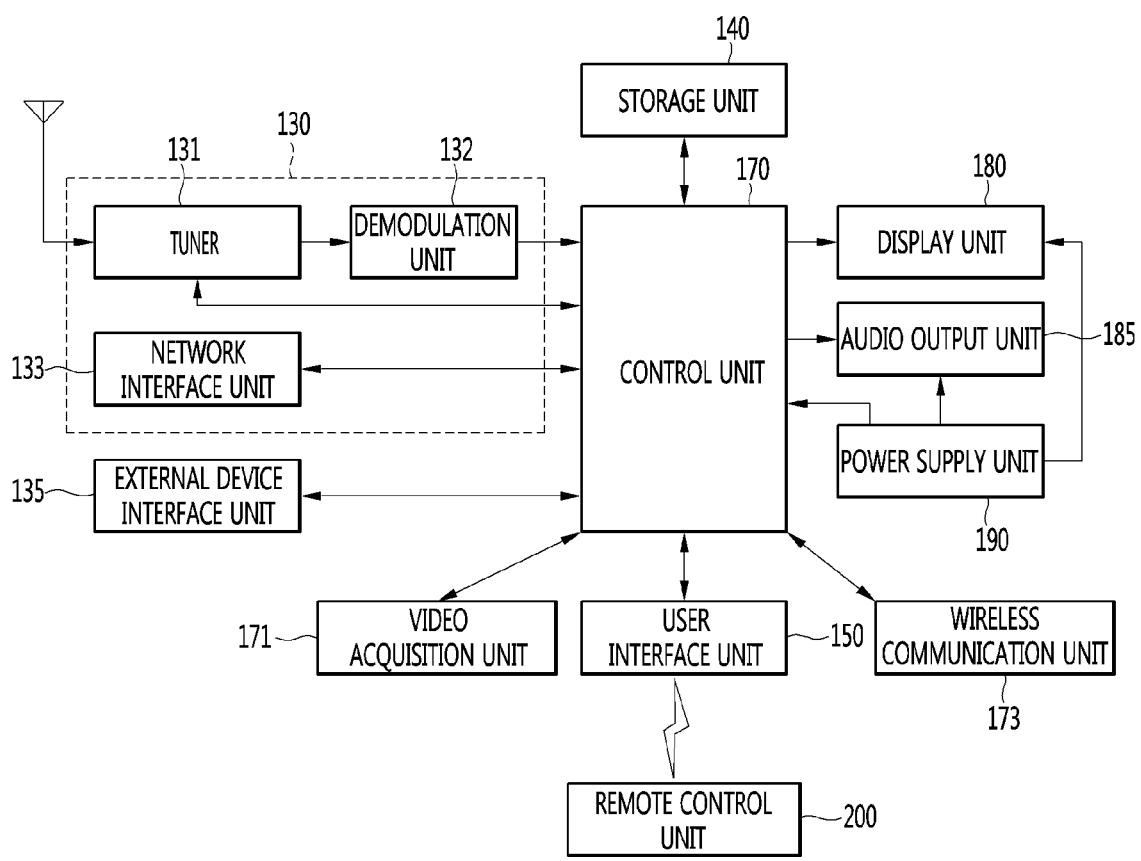
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 590.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image or audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Bluetooth Low Energy (BLE), Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
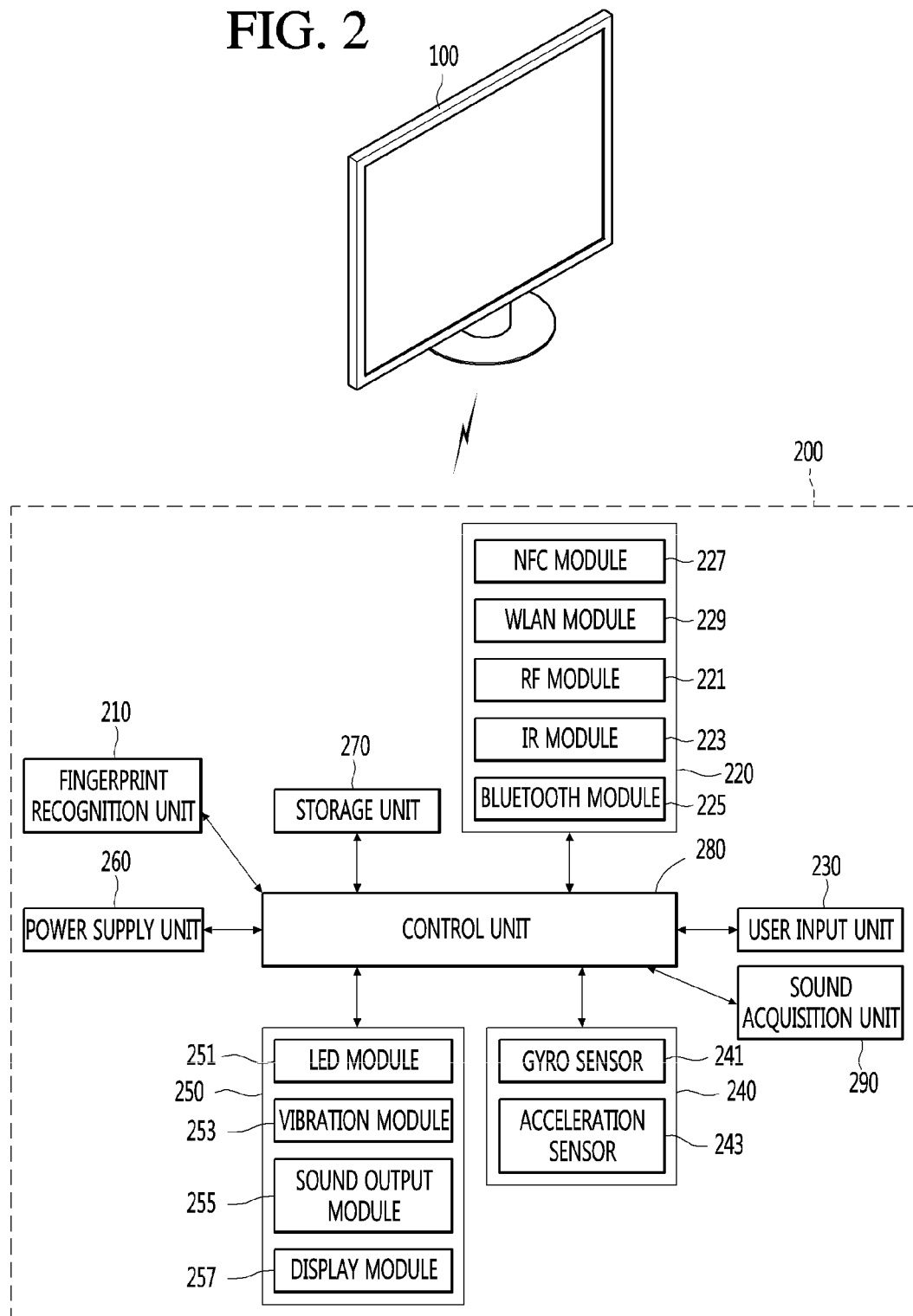
FIG. 2 is a block diagram illustrating a remote control device according to an embodiment of the present invention.
Figure 3:
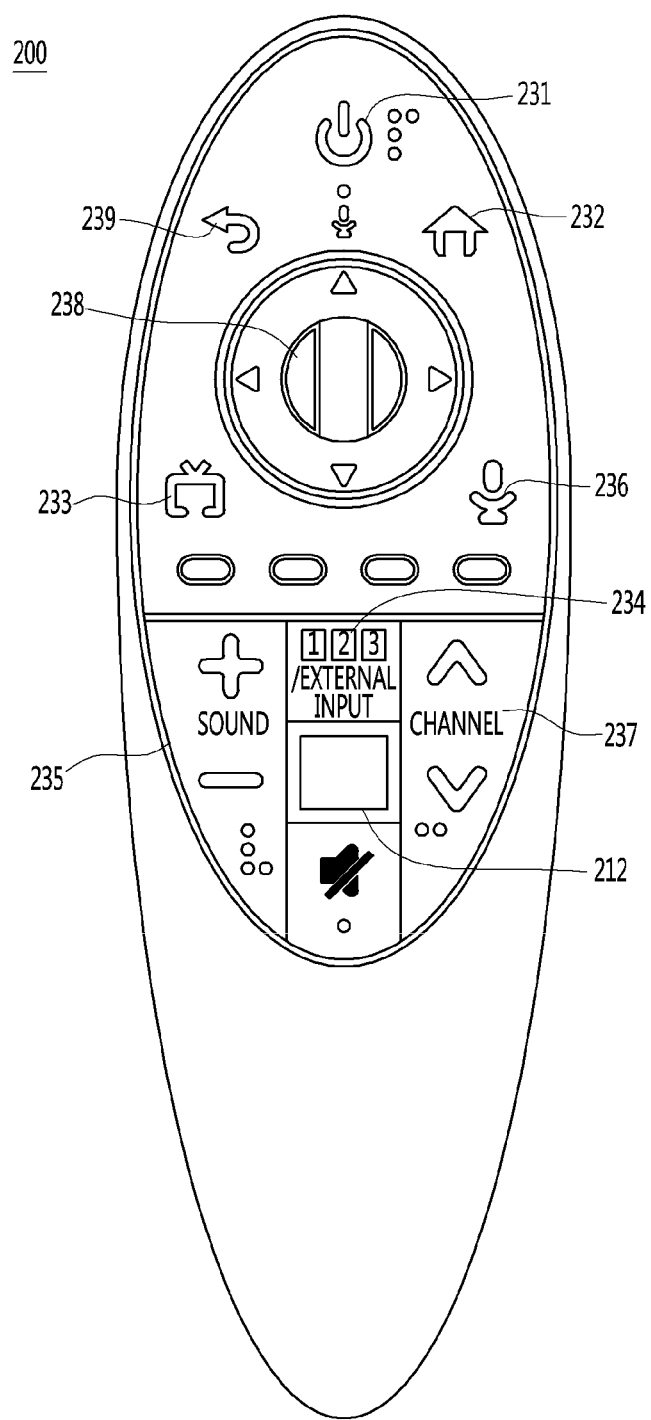
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
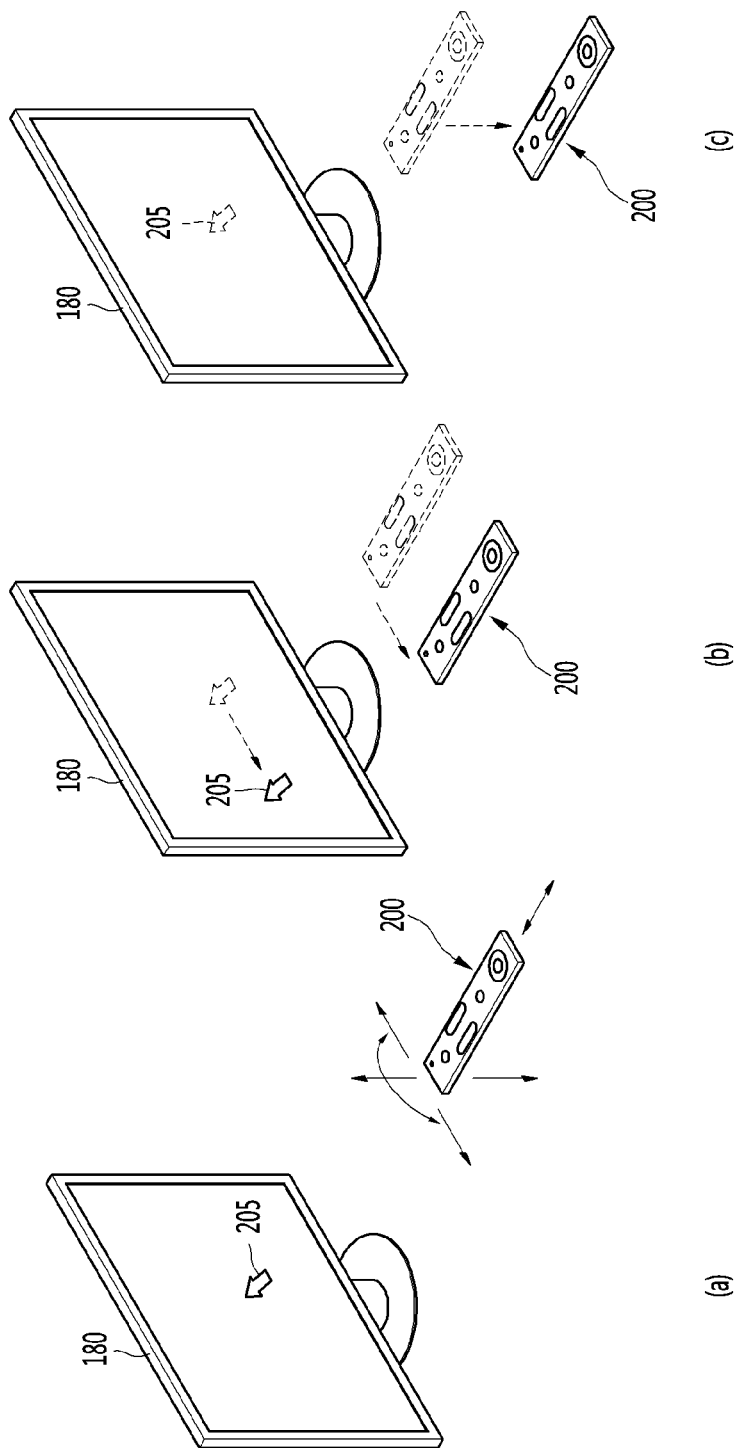
FIG. 4 is a view of utilizing a remote control device according to an embodiment of the present invention.

Then, FIG. 4 is described.

FIG. 4 is a view of utilizing a remote control device according to an embodiment of the present invention.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(b) illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Then, a configuration of a mobile terminal according to an embodiment of the present invention will be described with reference to FIG. 5.

Figure 5:
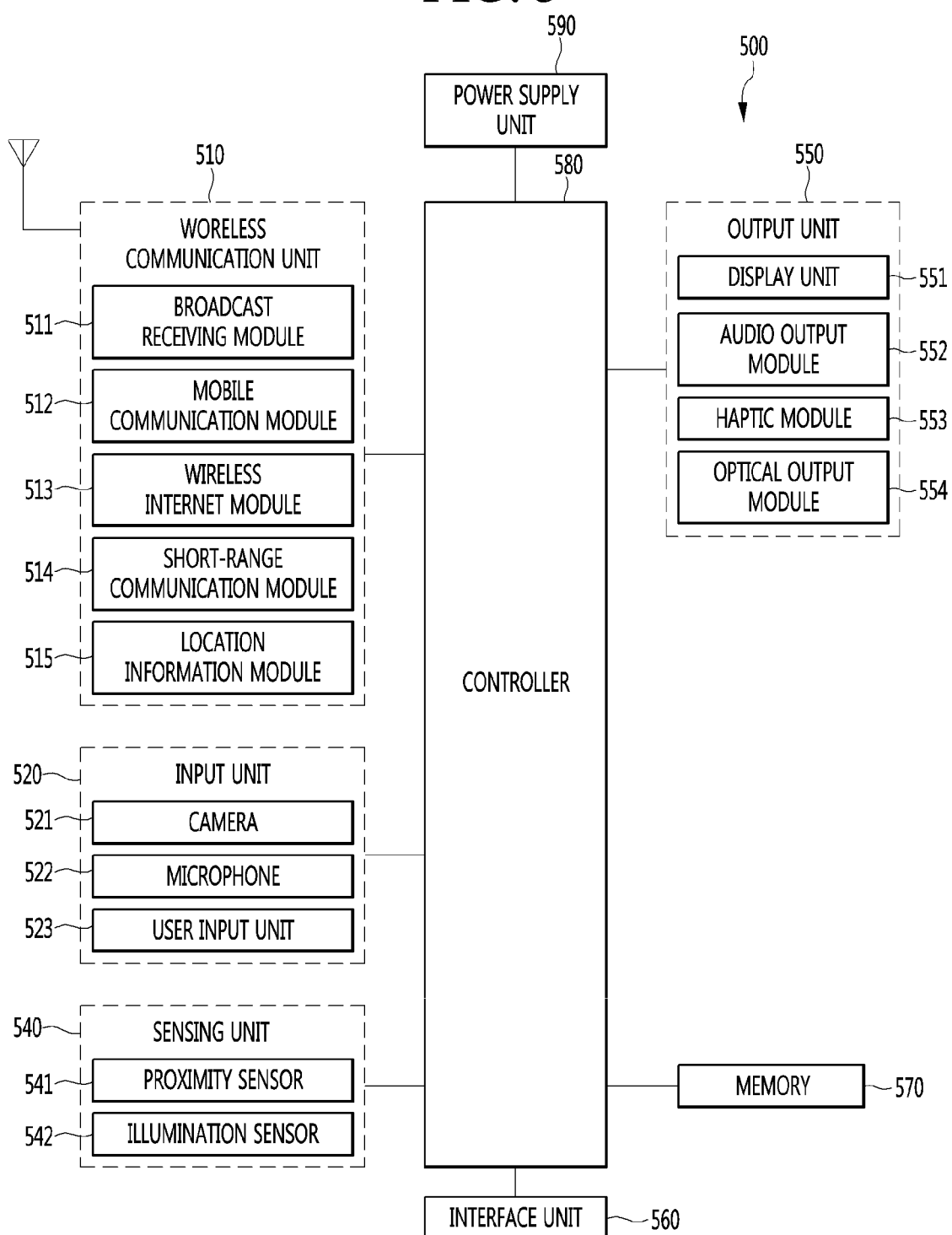
FIG. 5 is a block diagram illustrating a mobile terminal according to an embodiment of the present invention.

FIG. 5 is a block diagram illustrating a mobile terminal according to an embodiment of the present invention.

The mobile terminal 500 can include a wireless communication unit 510, an input unit 520, the sensing unit 540, an output unit 550, an interface unit 560, the memory 570, a control unit 580, and a power supply unit 590. In implementing a mobile terminal, components shown in FIG. 5 are not necessary, so that a mobile terminal described in this specification can include components less or more than the components listed above.

In more detail, the wireless communication unit 510 in the components can include at least one module allowing wireless communication between the mobile terminal 500 and a wireless communication system, between the mobile terminal 500 and another mobile terminal 500, or between the mobile terminal 500 and an external server. Additionally, the wireless communication unit 510 can include at least one module connecting the mobile terminal 500 to at least one network.

The wireless communication unit 510 can include at least one of a broadcast receiving module 511, a mobile communication module 512, a wireless internet module 513, a short-range communication module 514, or a location information module 515.

The input unit 520 can include a camera 521 or an image input unit for image signal input, a microphone 522 or an audio input unit for receiving audio signal input, and a user input unit 523 (for example, a touch key and a mechanical key)) for receiving information from a user. Voice data or image data collected by the input unit 520 are analyzed and processed as a user's control command.

The sensing unit 540 can include at least one sensor for sensing at least one of information in a mobile terminal, environmental information around a mobile terminal, or user information. For example, the sensing unit 540 can include at least one of a proximity sensor 541, an illumination sensor 542, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic noise, a healthcare sensor, and a biometric sensor). Moreover, a mobile terminal disclosed in this specification can combines information sensed by at least two or more sensors among such sensors and can then utilize it.

The output unit 550 is used to generate a visual, auditory, or haptic output and can include at least one of a display unit 551, a sound output unit 552, a haptic module 553, or an optical output unit 554. The display unit 551 can be formed with a mutual layer structure with a touch sensor or formed integrally, so that a touch screen can be implemented. Such a touch screen can serve as the user input unit 523 providing an input interface between the mobile terminal 500 and a user and an output interface between the mobile terminal 500 and a user at the same time.

The interface unit 560 can serve as a path to various kinds of external devices connected to the mobile terminal 500. The interface unit 560 can include at least one of a wired/wireless headset port, an external charger port, a wired/wireless data port, a memory card port, a port connecting a device equipped with an identification module, an audio Input/Output (I/O) port, a video I/O port, or an earphone port. In correspondence to that an external device is connected to the interface unit 560, the mobile terminal 500 can perform an appropriate control relating to the connected external device.

Additionally, the memory 570 can store data supporting various functions of the mobile terminal 500. The memory 570 can store a plurality of application programs (for example, application programs or applications) running on the mobile terminal 500 and also data and commands for operations of the mobile terminal 500. At least part of such an application program can be downloaded from an external server through a wireless communication. Additionally, at least part of such an application program can be included in the mobile terminal 500 from the time of shipment in order to perform a basic function (for example, an incoming call, a transmission function, and a message reception) of the mobile terminal 500. Moreover, an application program can be stored in the memory 570 and installed on the mobile terminal 500, so that it can run to perform an operation (or a function) of the mobile terminal 100 by the control unit 580.

The control unit 580 can control overall operations of the mobile terminal 500 generally besides an operation relating to the application program. The control unit 580 can provide appropriate information or functions to a user or process them by processing signals, data, and information inputted/outputted through the above components or executing application programs stored in the memory 570.

Additionally, in order to execute an application program stored in the memory 570, the control unit 580 can control at least part of the components shown in FIG. 5. Furthermore, in order to execute the application program, the control unit 580 can combine at least two of the components in the mobile terminal 500 and can then operate it.

The power supply unit 590 can receive external power or internal power under a control of the control unit 580 and can then supply power to each component in the mobile terminal 500. The power supply unit 590 includes a battery and the battery can be a built-in battery or a replaceable battery.

At least part of the each component can operate cooperatively in order to implement operations, controls, or control methods of a mobile terminal 100 according to various embodiments of the present invention described below. Additionally, the operations, controls, or control methods of a mobile terminal 100 can be implemented on the mobile terminal 100 by executing at least one application program stored in the memory 570.

Hereinafter, prior to examining various embodiments implemented through the mobile terminal 500, the above-listed components are described in more detail with reference to FIG. 5.

First, in describing the wireless communication unit 510, the broadcast receiving module 510 of the wireless communication unit 511 can receive a broadcast signal and/or broadcast related information from an external broadcast management server through a broadcast channel. The broadcast channel can include a satellite channel and a terrestrial channel. At least two broadcast receiving modules for simultaneous broadcast reception for at least two broadcast channels or broadcast channel switching can be provided to the mobile terminal 100.

The mobile communication module 512 can transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTE-A)).

The wireless signal can include various types of data according to a voice call signal, a video call signal, or text/multimedia message transmission.

The wireless internet module 513 refers to a module for wireless internet access and can be built in or external to the mobile terminal 500. The wireless internet module 513 can be configured to transmit/receive a wireless signal in a communication network according to wireless internet technologies.

The wireless internet technology can include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 513 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 513 performing wireless internet access through the mobile communication network can be understood as one type of the mobile communication module 512.

The short-range communication module 514 can support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies. The short-range communication module 514 can support wireless communication between the mobile terminal 500 and a wireless communication system, between the mobile terminal 500 and another mobile terminal 500, or between networks including the mobile terminal 500 and another mobile terminal 100 (or an external server) through wireless area networks. The wireless area networks can be wireless personal area networks.

Here, the other mobile terminal 500 can be a wearable device (for example, a smart watch, a smart glass, and an HMD) that is capable of exchanging data (or interworking) with the mobile terminal 500. The short-range communication module 514 can detect (or recognize) a wearable device around the mobile terminal 500, which is capable of communicating with the mobile terminal 500 Furthermore, if the detected wearable device is a device authenticated to communicate with the mobile terminal 500, the control unit 580 can transmit at least part of data processed in the mobile terminal 500 to the wearable device through the short-range communication module 514. Accordingly, a user of the wearable device can use the data processed in the mobile terminal 500 through the wearable device. For example, according thereto, if a call is received by the mobile terminal 500, a user can perform a phone call through the wearable device or if a message is received by the mobile terminal 500, a user can check the received message.

The location information module 515 is a module for obtaining the location (or the current location) of a mobile terminal and its representative examples include a global positioning system (GPS) module or a Wi-Fi module. For example, the mobile terminal can obtain its position by using a signal transmitted from a GPS satellite through the GPS module. As another example, the mobile terminal can obtain its position on the basis of information of a wireless access point (AP) transmitting/receiving a wireless signal to/from the Wi-Fi module, through the Wi-Fi module. If necessary, the position information module 115 can perform a function of another module in the wireless communication unit 510 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 520 is used for inputting image information (or signal), audio information (or signal), data, or information inputted from a user and the mobile terminal 500 can include at least one camera 521 in order for inputting image information. The camera 521 processes image frames such as a still image or a video obtained by an image sensor in a video call mode or a capturing mode. The processed image frame can be displayed on the display unit 551 or stored in the memory 570. Moreover, a plurality of cameras 521 equipped in the mobile terminal 500 can be arranged in a matrix structure and through the camera 521 having such a matrix structure, a plurality of image information having various angles or focuses can be inputted to the input terminal 500. Additionally, the plurality of cameras 521 can be arranged in a stereo structure to obtain the left and right images for implementing a three-dimensional image.

The microphone 522 processes external sound signals as electrical voice data. The processed voice data can be utilized variously according to a function (or an application program being executed) being performed in the mobile terminal 500. Moreover, various noise canceling algorithms for removing noise occurring during the reception of external sound signals can be implemented in the microphone 522.

The user input unit 523 is to receive information from a user and if information is inputted through the user input unit 523, the control unit 580 can control an operation of the mobile terminal 500 to correspond to the inputted information. The user input unit 523 can include a mechanical input means (or a mechanical key, for example, a button, a dome switch, a jog wheel, and a jog switch at the front, back or side of the mobile terminal 500) and a touch type input means. As one example, a touch type input means can include a virtual key, a soft key, or a visual key, which is displayed on a touch screen through software processing or can include a touch key disposed at a portion other than the touch screen. Moreover, the virtual key or visual key can have various forms and can be disposed on a touch screen and for example, can include graphic, text, icon, video, or a combination thereof.

Moreover, the sensing unit 540 can sense at least one of information in a mobile terminal, environmental information around a mobile terminal, or user information and can then generate a sensing signal corresponding thereto. On the basis of such a sensing signal, the control unit 580 can control the drive or control of the mobile terminal 500 or can perform data processing, functions, or operations relating to an application program installed in the mobile terminal 500. Representative sensors among various sensors included in the sensing unit 540 will be described in more detail.

First, the proximity sensor 541 refers to a sensor detecting whether there is an object approaching a predetermined detection surface or whether there is an object around by using the strength of an electromagnetic field or infrared, without mechanical contact. The proximity sensor 541 can disposed in an inner area of a mobile terminal surrounded by the touch screen or around the touch screen.

Examples of the proximity sensor 541 can include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 541 can be configured to detect the proximity of an object by changes in an electric field according to the proximity of the object having conductivity. In this case, the touch screen (or a touch sensor) itself can be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen if the object is proximity-touched. The proximity sensor 541 can detect a proximity touch and a proximity touch pattern (for example, a proximity touch distance, a proximity touch direction, a proximity touch speed, a proximity touch time, a proximity touch position, and a proximity touch movement state). Moreover, the control unit 580 processes data (for information) corresponding to a proximity touch operation and a proximity touch pattern, detected through the proximity sensor 541, and furthermore, can output visual information corresponding to the processed data on the touch screen. Furthermore, according to whether a touch for the same point on the touch screen is a proximity touch or a contact touch, the control unit 580 can control the mobile terminal 500 to process different operations or data (or information).

The touch sensor detects a touch (or a touch input) applied to the touch screen (or the display unit 551) by using at least one of various touch methods, for example, a resistive film method, a capacitive method, an infrared method, an ultrasonic method, or a magnetic field method.

For example, the touch sensor can be configured to convert a pressure applied to a specific portion of the touch screen or changes in capacitance occurring at a specific portion into electrical input signals. The touch sensor can be configured to detect a position and area that a touch target applying a touch on the touch screen touches the touch sensor, a pressured if touched, and a capacitance if touched. Here, the touch target, as an object applying a touch on the touch sensor, can be a finger, a touch pen, a stylus pen, or a pointer, for example.

In such a manner, if there is a touch input on the touch sensor, signal(s) corresponding thereto are sent to a touch controller. The touch controller processes the signal(s) and then transmits corresponding data to the control unit 580. Therefore, the control unit 580 can recognize which area of the display unit 551 is touched. Herein, the touch controller can be an additional component separated from the control unit 580 or can be the control unit 580 itself.

Moreover, the control unit 580 can perform different controls or the same control according to types of a touch target touching the touch screen (or a touch key equipped separated from the touch screen). Whether to perform different controls or the same control according to types of a touch target can be determined according to a current operation state of the mobile terminal 500 or an application program in execution.

Moreover, the above-mentioned touch sensor and proximity sensor are provided separately or combined and can thus sense various types of touches, for example, short (or tap) touch, long touch, multi touch, drag touch, flick touch, pinch-in touch, pinch-out touch, swipe touch, and hovering touch for the touch screen.

The ultrasonic sensor can recognize position information of a detection target by using ultrasonic waves. Moreover, the control unit 580 can calculate the position of a wave source through information detected by an optical sensor and a plurality of ultrasonic sensors. The position of the wave source can be calculated by using the property that light is much faster than ultrasonic wave, that is, a time that light reaches an optical signal is much shorter than a time that ultrasonic wave reaches an ultrasonic sensor. In more detail, the position of the wave source can be calculated by using a time difference with a time that ultrasonic wave reaches by using light as a reference signal.

Moreover, the camera 520 described as a configuration of the input unit 521 can include at least one of a camera sensor (for example, CCD and CMOS), a photo sensor (or an image sensor), or a laser sensor.

The camera 521 and the laser sensor can be combined to detect a touch of a detection target for a three-dimensional image. The photo sensor can be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor can calculate the coordinates of a detection target according to the amount of change in light and through this, can obtain the position information of the detection target.

The display unit 551 can display (output) information processed in the mobile terminal 500. For example, the display unit 551 can display execution screen information of an application program running on the mobile terminal 500 or user interface (UI) and graphic user interface (GUI) information according to such execution screen information.

Additionally, the display unit 551 can be configured as a three-dimensional display unit displaying a three-dimensional image.

A three-dimensional display method, for example, a stereoscopic method (a glasses method), an autostereoscopic (no glasses method), a projection method (a holographic method) can be applied to the three-dimensional display unit The sound output unit 552 can output audio data received from the wireless communication unit 510 or stored in the memory 570 in a call signal reception or call mode, a recording mode, a voice recognition mode, or a broadcast reception mode. The sound output unit 552 can output a sound signal relating to a function (for example, a call signal reception sound and a message reception sound) performed by the mobile terminal 500. The sound output unit 552 can include a receiver, a speaker, and a buzzer.

The haptic module 553 generates various haptic effects that a user can feel. A representative example of a haptic effect that the haptic module 553 generates is vibration. The intensity and pattern of vibration generated by the haptic module 553 can be controlled by a user's selection or a setting of a control unit. For example, the haptic module 553 can synthesize and output different vibrations or output different vibrations sequentially.

The haptic module 553 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 553 can be implemented to deliver a haptic effect through a direct contact and also allow a user to feel a haptic effect through a muscle sense such as a finger or an arm. The haptic module 553 can be more than two according to a configuration aspect of the mobile terminal 500.

The optical output unit 554 outputs a signal for notifying event occurrence by using light of a light source of the mobile terminal 500. An example of an event occurring in the mobile terminal 500 includes message reception, call signal reception, missed calls, alarm, schedule notification, e-mail reception, and information reception through an application.

A signal outputted from the optical output unit 554 is implemented as a mobile terminal emits single color of multi-color to the front or the back. The signal output can be terminated if a mobile terminal detects user's event confirmation.

The interface unit 560 can serve as a path to all external devices connected to the mobile terminal 500. The interface unit 560 can receive data from an external device, receive power and deliver it to each component in the mobile terminal 500, or transmit data in the mobile terminal 500 to an external device. For example, the interface unit 560 can include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 500, can include a user identity module (UIM), a subscriber identity module (SIM), and a universal subscriber identity module (USIM). A device equipped with an identification module (hereinafter referred to as an identification device) can be manufactured in a smart card form. Accordingly, the identification device can be connected to the terminal 100 through the interface unit 560.

Additionally, if the mobile terminal 500 is connected to an external cradle, the interface unit 560 can become a path through which power of the cradle is supplied to the mobile terminal 500 or a path through which various command signals inputted from the cradle are delivered to the mobile terminal 500 by a user. The various command signals or the power inputted from the cradle can operate as a signal for recognizing that the mobile terminal 500 is accurately mounted on the cradle.

The memory 570 can store a program for an operation of the control unit 580 and can temporarily store input/output data (for example, a phone book, a message, a still image, and a video). The memory 570 can store data on various patterns of vibrations and sounds outputted during a touch input on the touch screen.

The memory 570 can include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 500 can operate in relation to a web storage performing a storage function of the memory 570 on internet.

Moreover, as mentioned above, the control unit 580 can control operations relating to an application program and overall operations of the mobile terminal 500 in general. For example, if a state of the mobile terminal 100 satisfies set conditions, the control unit 580 can execute or release a lock state limiting an output of a control command of a user for applications.

Additionally, the control unit 580 can perform a control or processing relating to a voice call, data communication, and a video call can perform pattern recognition processing for recognizing handwriting input or drawing input on the touch screen as a text and an image, respectively. Furthermore, the control unit 580 can use at least one or a combination of the above components to perform a control in order to implement various embodiments described below on the mobile terminal 500.

The power supply unit 590 can receive external power or internal power under a control of the control unit 580 and can then supply power necessary for an operation of each component. The power supply unit 590 includes a battery. The battery is a rechargeable built-in battery and can be detachably coupled to a terminal body in order for charging.

Additionally, the power supply unit 590 can include a connection port and the connection port can be configured as one example of the interface unit 160 to which an external charger supplying power for charging of the battery is electrically connected.

As another example, the power supply unit 590 can be configured to charge a battery through a wireless method without using the connection port. In this case, the power supply unit 590 can receive power from an external wireless power transmission device through at least one of an inductive coupling method based on a magnetic induction phenomenon, or a magnetic resonance coupling method based on an electromagnetic resonance phenomenon.

Moreover, various embodiments below can be implemented in a computer or device similar thereto readable medium by using software, hardware, or a combination thereof.

Then, a communication system using the mobile terminal 500 is described according to an embodiment of the present invention.

First, the communication system can use different wireless interfaces and/or physical layers. For example, a wireless interface available to the communication system can include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system can include at least one terminal 100, at least one base station (BS) (it can be referred to as Node B or Evolved Node B), at least one base station controllers (BSCs), and a mobile switching center (MSC). MSC can be configured to be connected to Public Switched Telephone Network (PSTN) and BSCs. BSCs can be connected being paired with a BS through a backhaul line. The backhaul line can be provided according to at least one of E1/T1, ATM, IP, PPP, Frame Relay, HDSL, ADSL, or xDSL. Accordingly, a plurality of BSCs can be included in a CDMA wireless communication system.

Each of a plurality of BSs can include at least one sensor and each sensor can include an omni-directional antenna or an antenna indicating a specific radial direction from a BS.

Additionally, each sensor can include at least two antennas in various forms. Each BS can be configured to support a plurality of frequency allocations and each of the plurality of frequency allocations can have a specific spectrum (for example, 1.25 MHz, 5 MHz, and so on).

The intersection of a sector and a frequency allocation can be referred to as a CDMA channel. A BS can be referred to as a Base Station Transceiver Subsystem (BTS). In such a case, one BSC and at least one BS together can be referred to as "BS". ABS can also represent "cell site". Additionally, each of a plurality of sectors for a specific BS can be referred to as a plurality of cell sites.

A Broadcasting Transmitter (BT) transmits broadcast signals to the terminals 100 operating in a system. The broadcast reception module 511 shown in FIG. 5 is provided in the terminal 100 for receiving broadcast signals transmitted from the BT.

Additionally, GPS can be linked to a CDMA wireless communication system in order to check the location of the mobile terminal 500. Then, a satellite helps obtaining the location of the mobile terminal 500. Useful location information can be obtained by at least one satellite. Herein, the location of the mobile terminal 500 can be traced by using all techniques for tracing the location in addition to GPS tracking technique. Additionally, at least one GPS satellite can be responsible for satellite DMB transmission selectively or additionally.

The location information module 515 in a mobile terminal is for detecting and calculating the position of the mobile terminal and its representative example can include a GPS module and a WiFi module. If necessary, the position information module 115 can perform a function of another module in the wireless communication unit 510 in order to obtain data on the location of the mobile terminal substitutionally or additionally.

The GPS module 115 can calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 can speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) can be utilized.

WPS is a technique for tracking the location of the mobile terminal 500 by using a WiFi module in the mobile terminal 500 and a wireless Access Point (AP) for transmitting or receiving wireless signals to or from the WiFi module and can mean a Wireless Local Area Network (WLAN) based location measurement technique using WiFi.

A WiFi location tracking system can include a WiFi location measurement server, a mobile terminal 500, a wireless AP connected to the mobile terminal 500, and a database for storing arbitrary wireless AP information.

The mobile terminal 500 in access to a wireless AP can transmit a location information request message to a WiFi location measurement server.

The WiFi location measurement server extracts information of a wireless AP connected to the mobile terminal 500 on the basis of a location information request message (or signal) of the mobile terminal 500. Information of a wireless AP connected to the mobile terminal 500 can be transmitted to the WiFi location measurement server through the mobile terminal 500 or can be transmitted from a wireless AP to a WiFi location measurement server.

Based on the location information request message of the mobile terminal 500, the extracted information of a wireless AP can be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, or Noise Strength.

As mentioned above, the WiFi position measurement server can extract wireless AP information corresponding to a wireless AP that the mobile terminal 500 access from a pre-established database by using information of the wireless AP connected to the mobile terminal 100. At this point, information of arbitrary wireless APs stored in the database can information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server can extract only a predetermined number of wireless AP information in high RSSI order.

Then, the WiFi location measurement server can extract (or analyze) the location information of the mobile terminal 500 by using at least one wireless AP information extracted from the database. By comparing the included information and the received wireless AP information, location information of the mobile terminal 500 is extracted (or analyzed).

As a method of extracting (or analyzing) the location information of the motile terminal 500, a Cell-ID method, a finger-print method, a triangulation method, and a landmark method can be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but if the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) can be used.

The landmark method is a method for measuring the location of a mobile terminal by using a landmark transmitter knowing the location.

In addition to the listed methods, a variety of algorithms can be utilized as methods for extracting (or analyzing) the location information of a mobile terminal.

As the extracted location information of the mobile terminal 500 is transmitted to the mobile terminal 500 through the WiFi location measurement server, the mobile terminal 500 can obtain the location information.

As connected to at least one wireless AP, the mobile terminal 500 can obtain location information. At this point, the number of wireless APs, which are required for obtaining the location information of the mobile terminal 500, can vary according to a wireless communication environment where the mobile terminal 500 is located.

Hereinafter, a method for operating the display device 100 according to an embodiment of the present invention will be described with reference to FIGS. 6 to 32.

Figure 6:
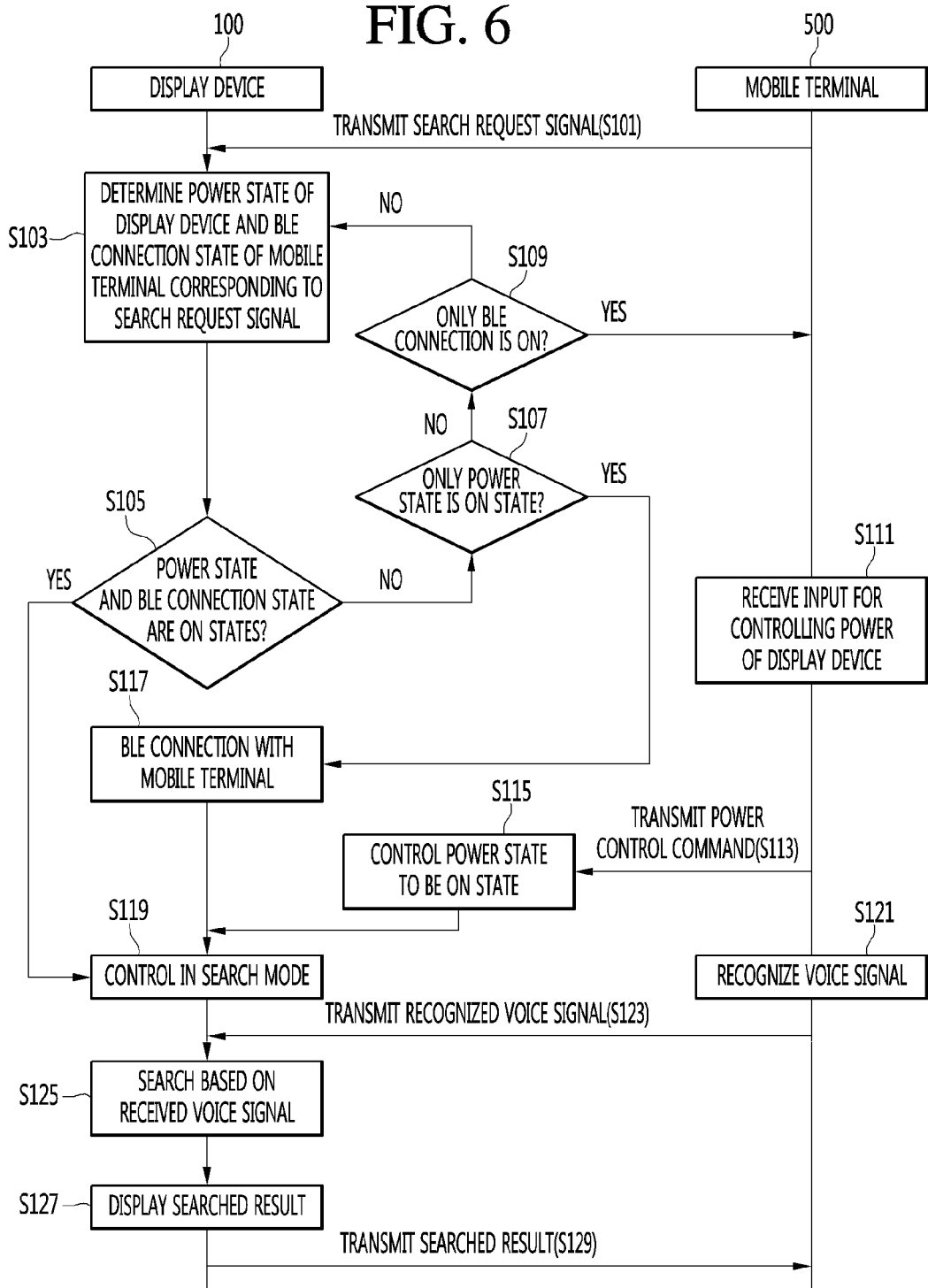
FIG. 6 a ladder diagram illustrating the operating method between the display device and the mobile terminal according to an embodiment of the present invention.

First, FIG. 6 a ladder diagram illustrating the operating method between the display device and the mobile terminal according to an embodiment of the present invention.

The wireless communication unit 510 of the mobile terminal 500 may transmit a search request signal to the display device 100 (S101).

The search request signal according to an embodiment of the present invention may be a signal allowing the display device 100 to operate in a search mode. The search mode according to an embodiment of the present invention may be a mode in which the display device 100 may receive a voice signal from the mobile terminal 500 and may search for information associated with the received voice signal.

When the display device 100 operates in the search mode, a user may easily search for specific information while talking by the mobile terminal 500. For example, the user may wonder about the specific information while making a voice call. When the user carries out search using the mobile terminal 500, the user has to stop the talking or conversation. However, when the user carries out the search using the display device 100, the user may conveniently search for what the user wonders while keeping making a voice call with the outer party. In particular, when the search is performed through the voice signal of the user, it may be overcome the difficulty that the user has to input a search word while taking by the mobile terminal 500.

Next, a method that the display device 100 according to an embodiment of the present invention receives the search request signal from the mobile terminal 500 will be described with reference to FIGS. 7 to 9.

Figure 7:
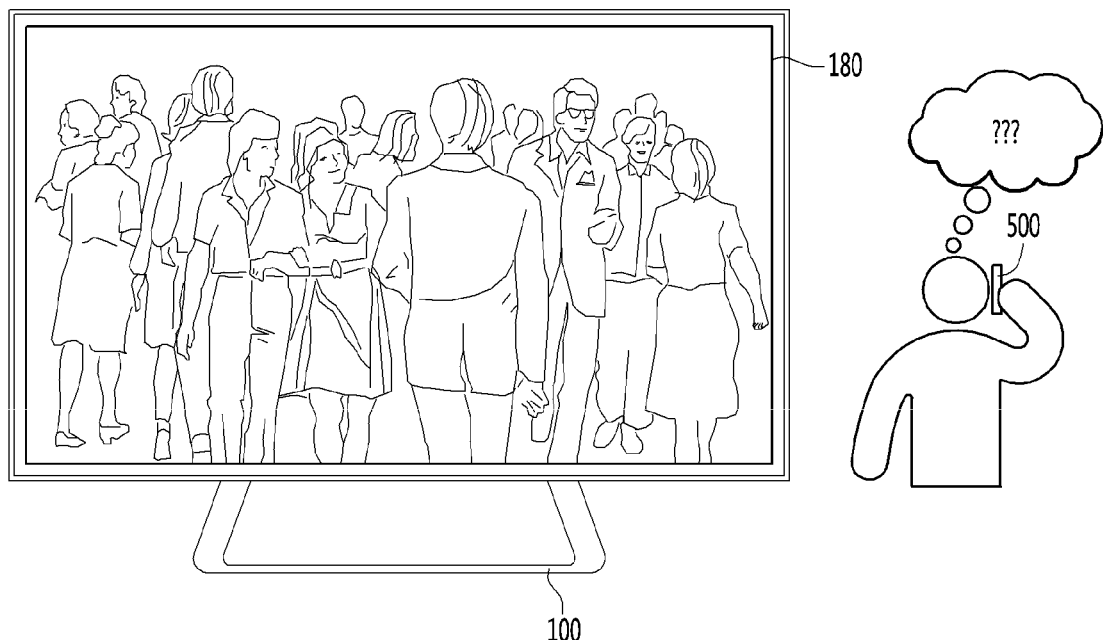
FIG. 7 illustrates a conventional problem.

FIG. 7 illustrates a conventional problem. As illustrated in FIG. 7, the user may be talking on the mobile terminal 500. The user may want to search for specific information during making the voice call. The user may search for the specific information through the display device 100 adjacent to the mobile terminal 500.

Figure 8:
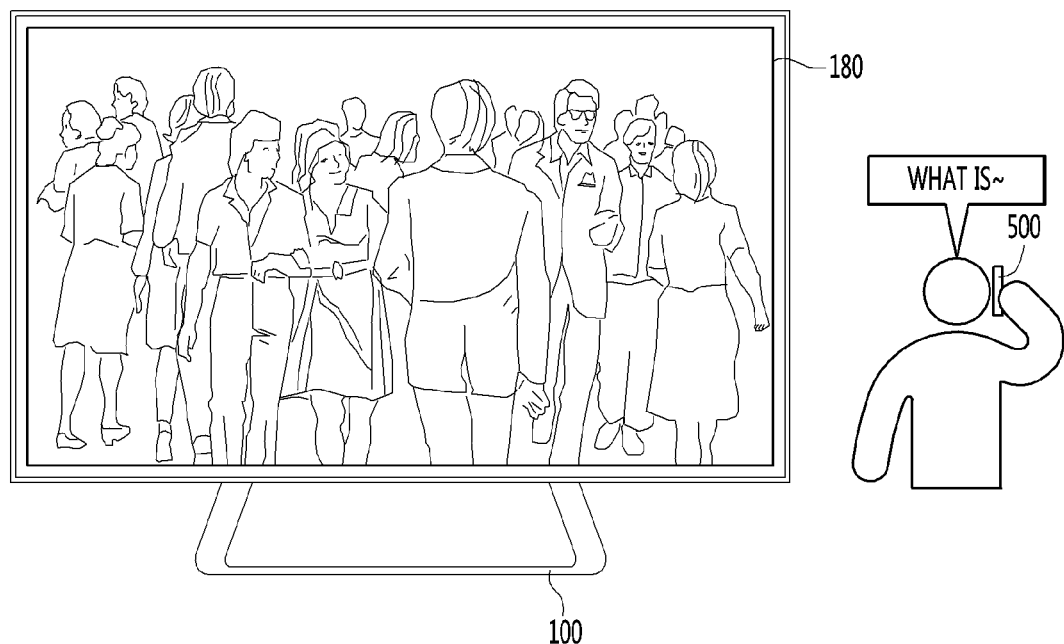
FIG. 8 is a view illustrating a method of receiving the search request signal according to a first embodiment of the present invention.

FIG. 8 is a view illustrating a method of receiving the search request signal according to a first embodiment of the present invention. As illustrated in FIG. 8, the control unit 170 of the display device 100 may receive the search request signal as a voice signal including a preset keyword is recognized.

In detail, the control unit 580 of the mobile terminal 500 may recognize the voice signal in a call connection state. When the voice signal including the preset keyword is recognized, the control unit 580 of the mobile terminal 500 may transmit the recognized voice signal to the display device 100. The control unit 170 of the display device 100 may receive the voice signal including the preset keyword.

As mentioned above, the display device 100 may receive the search request signal through the voice signal including the preset keyword.

The keyword may be set by default. Alternatively, the keyword may be arbitrarily set through a user input. Although FIG. 8 illustrates that the keyword is set to "Do you know what ~" or "Let me know what ~" by way of example, this is provided only for the illustrative purpose.

Figure 9:
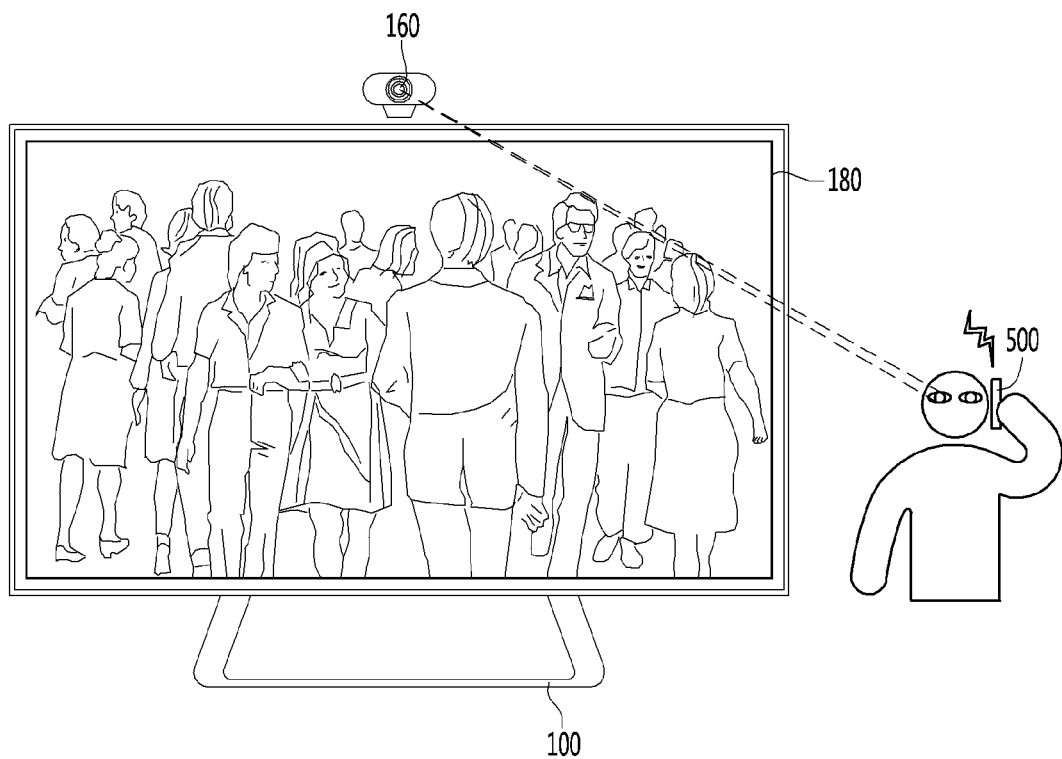
FIG. 9 is a view illustrating a method of receiving the search request signal according to a second embodiment of the present invention.

FIG. 9 is a view illustrating a method of receiving the search request signal according to a second embodiment of the present invention.

The display device 100 may include a camera 160. The camera 160 may capture an image of an area closer to the display device 100. The control unit 170 of the display device 100 may sense the eyes of the user through the camera 160.

In addition, the display device 100 may have a BLE connection state with at least one mobile terminal 500. The control unit 170 of the display device 100 may sense that any one of mobile terminals 500 having BLE connection state is in the call connection state.

The control unit 170 of the display device 100 may receive the search request signal as the control unit 170 senses any one mobile terminal 500 being in the call connection state and senses the eyes of the user facing the direction of the display device 100 for a preset time.

In addition, the display device 100 may receive the search request signal through another method. For example, the control unit 580 of the mobile terminal 500 may transmit the search request signal to the display device 100 when analyzing the voice of the user and recognizing a questionable tone. As another example, when the mobile terminal 500 is changed to be in the call connection state, the display device 100 may receive the search request signal.

As mentioned above, the control unit 170 of the display device 100 may receive the search request signal from the mobile terminal 500.

The following description will be made with reference to FIG. 6 again.

The control unit 170 of the display device 100 may determine a power state of the display device 100 and the BLE connection state with the mobile terminal 500 corresponding to the search request signal (S103).

According to the present invention, the power state of the display device 100 may correspond to any one of an On state and an Off state.

In addition, the display device 100 may have any one of an On state and an Off state in Bluetooth Low Energy (BLE) connection state with a specified mobile terminal 500.

Accordingly, the display device 100 may correspond to any one of 1) a power On state and a BLE On state, 2) a power On state and a BLE Off state, 3) a power Off state and the BLE On state, and 4) a power Off state and a BLE Off state.

Whether the display device 100 operates depends on the power state and the BLE connection state of the display device 100. Accordingly, the control unit 170 of the display device 100 may determine both the power state and the BLE connection state in response to receiving the search request signal.

First, the case that both the power state and the BLE connection state are On states will be described below.

The control unit 170 may determine that both the power state and the BLE connection state are On states. In this case, the control unit 170 may control the display device 100 to be in the search mode (S119). The details of the search mode will be described below.

Second, the case that the power state is an On state and the BLE connection state is an Off state will be described below.

The control unit 170 may determine that only the power state is an On state (S107).

The control unit 170 may be BLE connected with the mobile terminal 500 (S117).

In detail, the control unit 170 may be BLE connected with the mobile terminal 500 when the BLE connection state with the mobile terminal 500 is the Off state even through the power state is an On state. In particular, the control unit 170 may be BLE connected with the mobile terminal 500 corresponding to the received search request signal.

Figure 10:
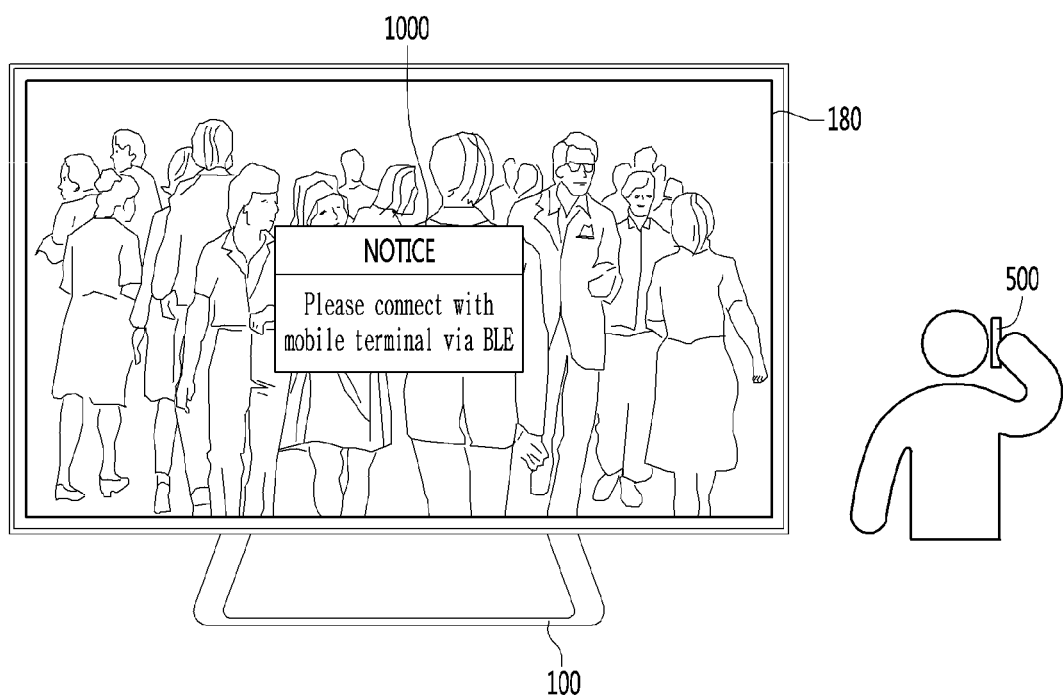
FIGS. 10 and 11 illustrate a method that the display device according to an embodiment of the present invention is BLE connected with the mobile terminal.
Figure 11:
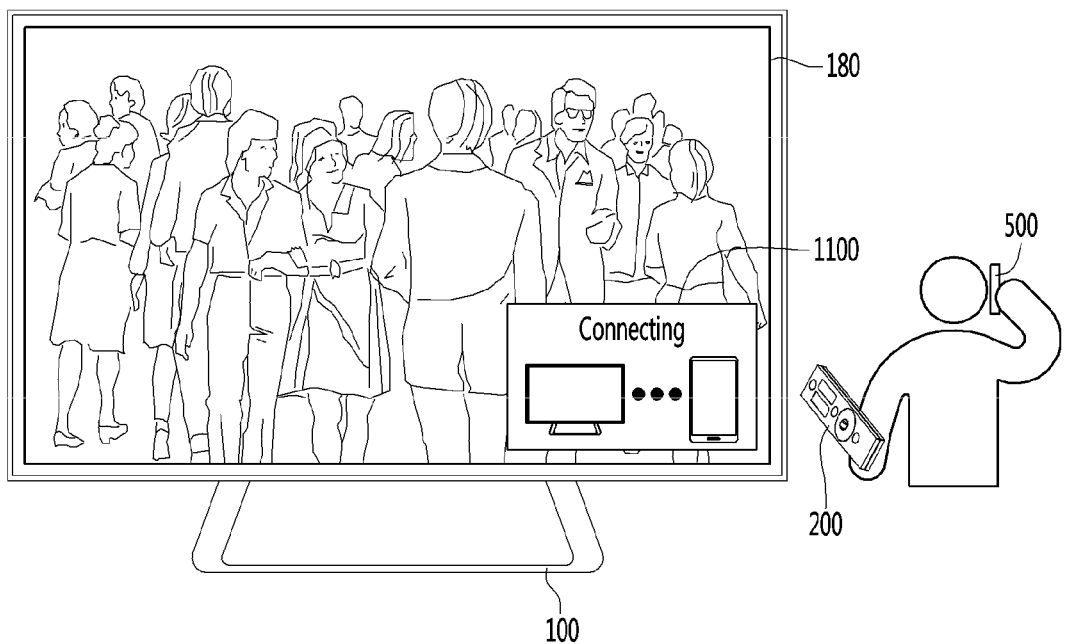

FIGS. 10 and 11 illustrate a method that the display device according to an embodiment of the present invention is BLE connected with the mobile terminal.

The control unit 170 of the display device 100 may control the display unit 180 to display a notification window 1000 on the as illustrated in FIG. 10 when only the power state is an On state. The display unit 180 may display the notification window 1000 including a request message for the BLE connection with the mobile terminal 500. For example, the display unit 180 may display the notification window 1000 including a message of "Please, connect with the mobile terminal through BLE".

The user may confirm the notification message 1000 displayed on the display unit 180 and may request for the BLE connection between the display device 100 and the mobile terminal 500. For example, as shown in FIG. 11, a user can request a BLE connection between the display device 100 and the mobile terminal 500 through a button provided in the remote control device 200.

The control unit 170 of the display device 100 may receive the BLE connection request through the remote control device 200 and may be BLE connected with the mobile terminal 500. In this case, the mobile terminal 500 may be the mobile terminal 500 that having transmitted the search request signal.

The control unit 170 of the display device 100 may control the display unit 180 to display a BLE connection notification window 1100 during the BLE connection with the mobile terminal 500. The BLE connection notification window 1100 may include messages, such as "under connection", "connection failure", "connection completion" or the like. The user may determine the BLE connection state between the display device 100 and the mobile terminal 500 through the BLE connection notification window 1100.

The following description will be made with reference to FIG. 6 again.

When the BLE connection with the mobile terminal 500 is completed (S117), the control unit 170 may control the display device 100 to be in the search mode (S119). The details of the search mode will be described below.

Third, the case in which the power supply state is an Off state and the BLE connection state is an ON state will be described below.

The control unit 170 may determine that only the BLE connection state is an On state (S109).

In this case, the mobile terminal 500 may receive an input for controlling power of the display device 100 (S111).

The control unit 580 of the mobile terminal 500 may transmit a power control command to the display device 100 (S113).

Upon receiving the power control command from the mobile terminal 500, the control unit 170 of the display device 1000 may control the power state to be an On state (S115).

Figure 12:
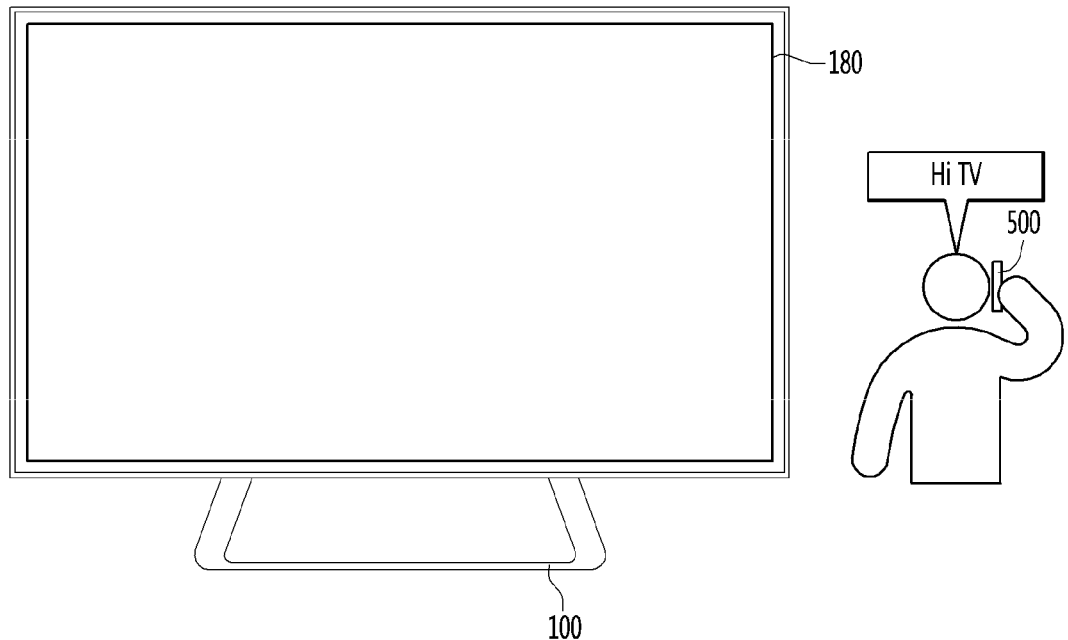
FIG. 12 is a view illustrating a method that the display device according to an embodiment of the present invention receives the power control command from the mobile terminal.

FIG. 12 is a view illustrating a method that the display device according to an embodiment of the present invention receives the power control command from the mobile terminal.

As illustrated in FIG. 12, the display device 100 may have been already connected with the mobile terminal 500 through the BLE even though the power of the display device 100 is an Off state. In this case, the control unit 170 of the display device 100 may power on by receiving the power control command from the mobile terminal 500. To this end, the mobile terminal 500 may receive an input for controlling power of the display device 100. The mobile terminal 500 may transmit the power control command to the display device 100.

The input for controlling the power may be an input for selecting a specific button provided in the mobile terminal 500. Alternatively, the input for controlling the power may be a trigger signal. For example, the trigger signal may be a specific voice signal. As illustrated in FIG. 12, the control unit 580 of the mobile terminal 500 may receive the input for controlling the power by sensing a preset voice signal such as "Hi TV". Accordingly, the control unit 580 of the mobile terminal 500 may transmit the power control command to the display device 100 and the display device 100 may turn on the power. The control unit 170 of the display device 100 may perform a control operation to operate in the search mode while turning on the power. In other words, the control unit 170 may turn on the power while displaying a window indicating that search is possible.

When the power of the display device 100 is turned off, the user may turn on the power of the display device 100 through the mobile terminal 500.

The following description will be made with reference to FIG. 6 again.

Fourthly, the case that both the power state and the BLE connection state are Off states will be described below.

The control unit 170 may determine that both the power state and the BLE connection state are Off states. In this case, the control unit 170 may attempt to make the BLE connection with the mobile terminal 500 after turning on the power.

The control unit 170 may control the power state and the BLE connection state to be On states through steps S103, S105, S107, S117, S109, S111, S113, and S115 described above.

Alternatively, if the user recognizes the power state and the BLE connection state of the display device 100, steps S103, S105, S107, S117, S109, S111, S113, and S115 may be omitted. In other words, since the user directly control the power state and the BLE connection state of the display device 100, the steps for determining the power state and the BLE connection state may be omitted.

When the control unit 170 may determine that both the power state and the BLE connection state are On states, the control unit 170 may perform a control operation such that the operation in the search mode is performed (S119).

The search mode may be a mode in which the display device 100 may receive a voice signal from the mobile terminal 500 and may search for information associated with the received voice signal.

The control unit 170 of the display device 100 may control the display unit 180 to display a screen corresponding to the search mode.

Figure 13:
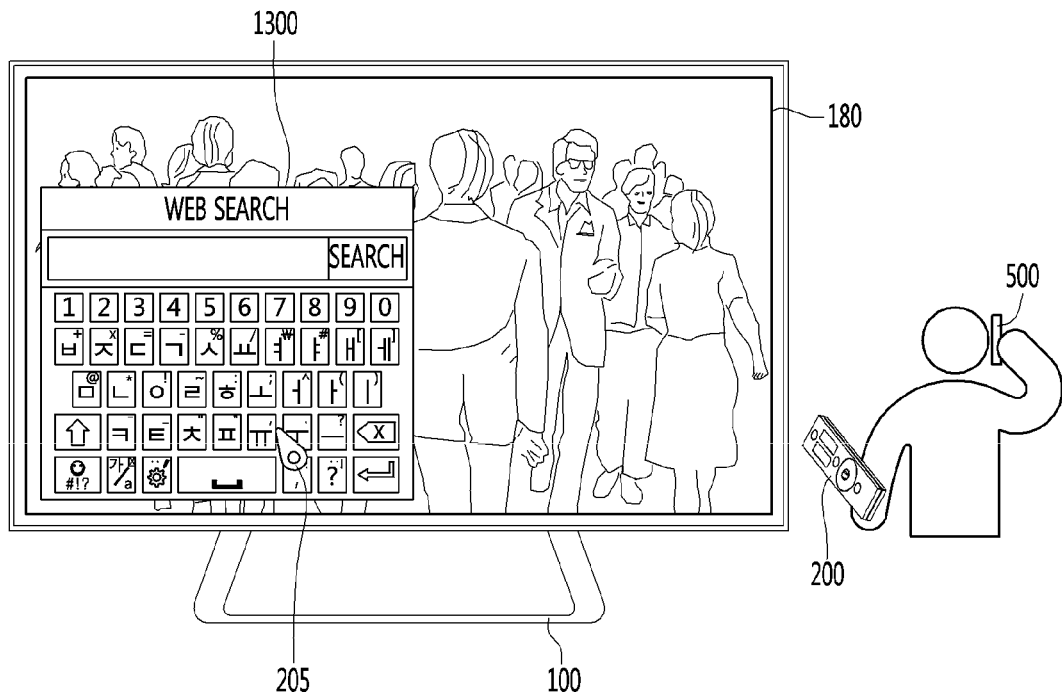
FIG. 13 is a view illustrating a method that the display device according to the first embodiment of the present invention displays the screen corresponding to the search mode.

FIG. 13 is a view illustrating a method that the display device according to the first embodiment of the present invention displays the screen corresponding to the search mode.

As illustrated in FIG. 13, the control unit 170 of the display device 100 may control the display unit 180 to display a web search window 1300 when the display device 100 operates in the search mode. In detail, the control unit 170 may control the display unit 180 to display the web search window 1300 together with a video. The web search window 1300 may include a search window and a keypad. The control unit 170 may search for information associated with the input search word by receiving an input of a search word through the web search window 1300.

The user may move a pointer 205 through the remote control device 100. The user may search for specific information on the web search window 1300 by moving the pointer 205.

Figure 14:
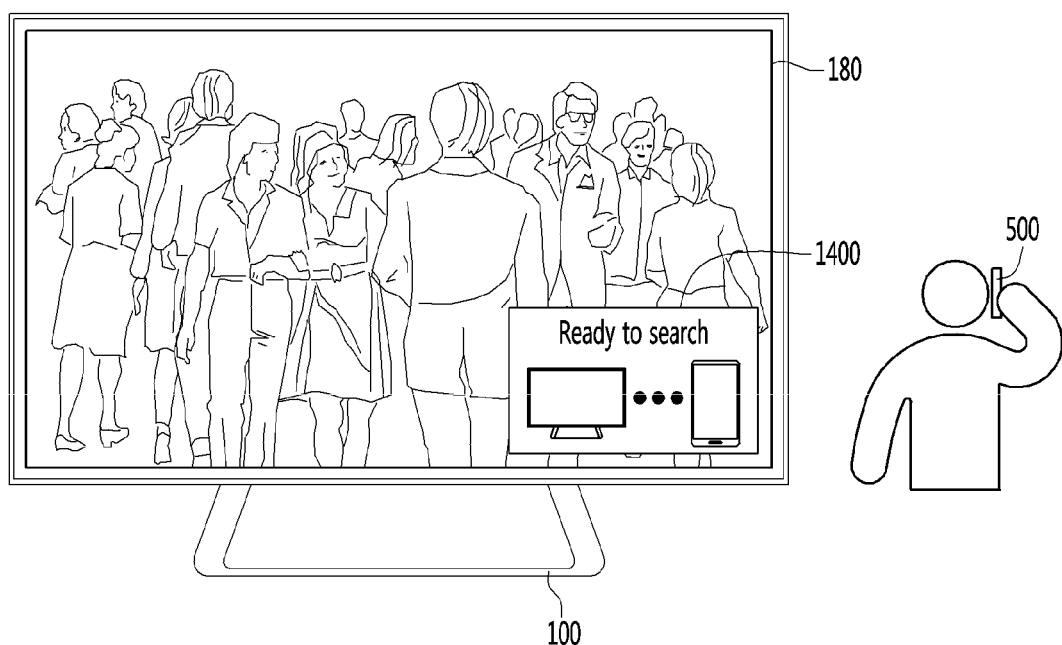
FIG. 14 is a view illustrating a method that the display device according to the second embodiment of the present invention displays the screen corresponding to the search mode.

FIG. 14 is a view illustrating a method that the display device according to the second embodiment of the present invention displays the screen corresponding to the search mode.

As illustrated in FIG. 14, the control unit 170 of the display device 100 may control the display unit 180 to display a voice search waiting window 1400 when the display device 100 operates in the search mode.

The voice search waiting window 1400 indicates that the display device 100 operates in the search mode. In other words, the voice search waiting window 1400 is to notify the user of that the display device 100 receives a voice signal from the mobile terminal 500 and is in a state that search is possible. The user may recognize that the user may view the voice search waiting window 1400 and may search for specific information through the mobile terminal 500

The web search window 1300 and the voice search waiting window 1400 illustrated FIGS. 13 and 14 are provided for the illustrative purpose, and the present invention is not limited thereto.

The following description will be made with reference to FIG. 6 again.

The mobile terminal 500 may recognize the voice signal (S121).

In detail, the input unit 520 of the mobile terminal 500 may recognize the voice signal.

The control unit 580 of the mobile terminal 500 may perform a control operation to transmit the recognized voice signal to the display device 100 (S123).

In detail, the control unit 580 may control the wireless communication unit 510 to transmit the recognized voice signal to the display device 100.

Figure 15:
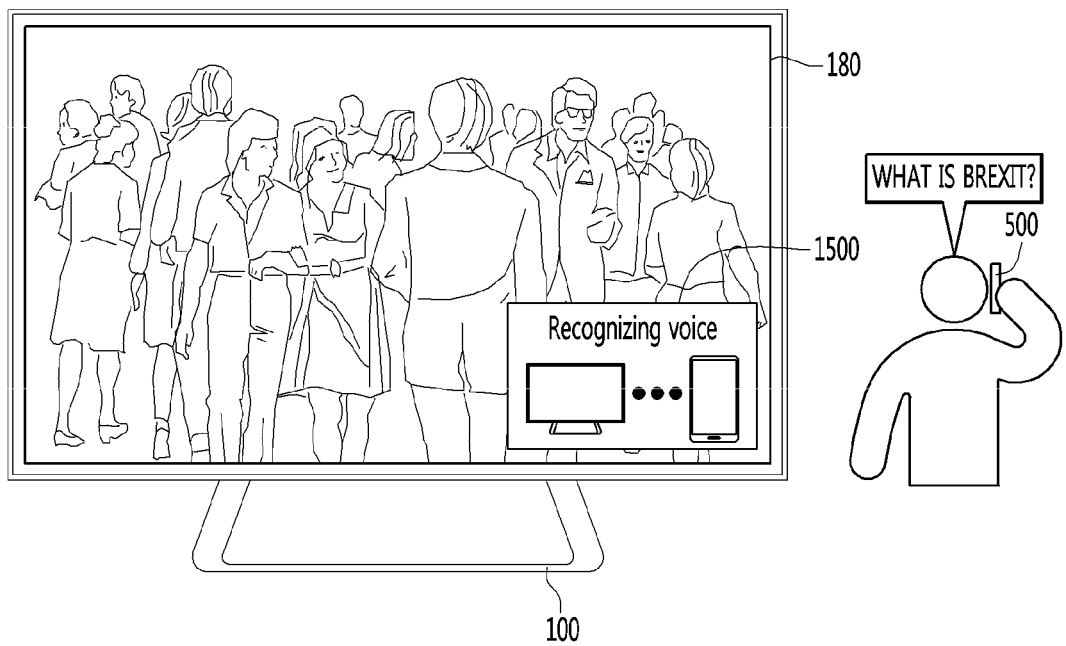
FIG. 15 is a view illustrating a method that the mobile terminal according to an embodiment of the present invention recognizes and transmits the voice signal.

FIG. 15 is a view illustrating a method that the mobile terminal according to an embodiment of the present invention recognizes and transmits the voice signal.

As illustrated in FIG. 15, the user may speak a search word to the mobile terminal 500. In detail, the user may speak the search word while making a voice call through the mobile terminal 500.

The mobile terminal 500 may recognize the voice of the user through the input unit 520. In detail, the input unit 520 of the mobile terminal 500 may recognize the voice signal for what the user speaks.

The control unit 580 of the mobile terminal 500 may perform a control operation to transmit the recognized voice signal to the display device 100. In detail, the control unit 580 of the mobile terminal 500 may transmit the recognized voice signal to the display device 100 while the display device 100 operates in the search mode. In detail, the control unit 580 of the mobile terminal 500 may transmit the recognized voice signal to the display device 100 while the specific button is selected.

The display device 100 may receive the voice signal from the mobile terminal 500. The control unit 170 of the display device 100 may perform a control operation to display a voice recognition window 1500 as illustrated in FIG. 15 by receiving the voice signal. The voice recognition window 1500 is to indicate that the display device 100 is receiving the voice signal from the mobile terminal 500.

The following description will be made with reference to FIG. 6 again.

The control unit 170 of the display device 100 may perform the search based on the received voice signal (S125).

As mentioned above, the control unit 170 of the display device 100 may receive a voice signal from the mobile terminal 500. The control unit 170 may obtain a search word by analyzing the received voice signal. The control unit 170 may perform a search based on the obtained search word. For example, the control unit 170 may perform a web search, a map search, an EPG search, an address book search in the mobile terminal 100, or a photo search in the mobile terminal 100 based on the obtained search word.

The control unit 170 of the display device 100 may control the display unit 180 to display the searched result (S127).

The display unit 180 of the display device 100 may display the searched result.

In search a manner, the user may search for specific information while making a voice call.

Hereinafter, a method that the display device 100 according to an embodiment of the present invention receives the voice signal from the mobile terminal 500 and performs the search will be described with reference to FIGS. 16 to 29.

FIGS. 16 to 22 are views illustrating a method that display device according to the first embodiment of the present invention receives a voice signal and displays the searched result.

As mentioned above, the control unit 170 of the display device 100 may analyze the voice signal from received the mobile terminal 500. The control unit 170 may obtain the search word based on the analysis result of the voice signal.

The following description will be made regarding a method of obtaining the search word according to an embodiment of the present invention. For example, the control unit 170 may analyze the voice signal and obtain a word matching the voice signal as the search word. Alternatively, the control unit 170 may obtain at least one word having pronunciation closest to that of the voice signal, as the search word.

In addition, the control unit 170 may analyze the voice signal and may obtain only a noun included in the received voice signal as the search word. In other words, the control unit 170 may obtain words, from which all postposition particles are excluded, as search words.

In addition, the control unit 170 may obtain at least one noun included in the voice signal and may obtain the obtained noun and a word obtained by translating the noun in a different language, as the search word.

The control unit 170 may perform the search based on the obtained search word through the above-described method.

Figure 16:
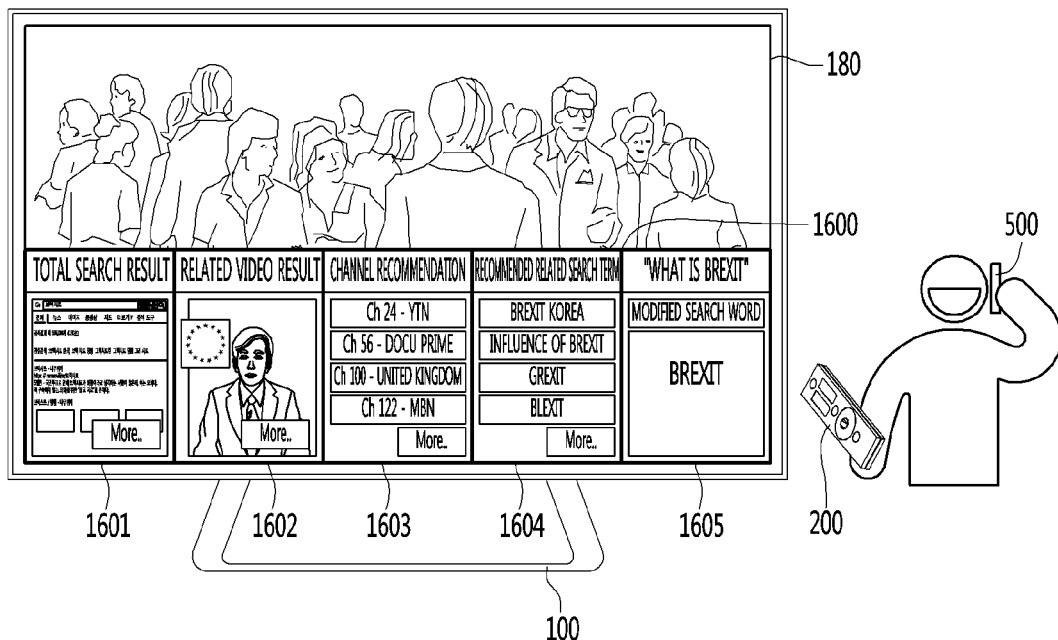
FIGS. 16 to 22 are views illustrating a method that the display device according to the first embodiment of the present invention receives a voice signal and displays the searched result.

The control unit 170 may perform a control operation such that the searched result is displayed on the display unit 180 as illustrated in FIG. 16.

The display unit 180 may display a search result window 1600 together with the video which is being viewed. The search result window 1600 may include at least one of a total search result item 1601, a related video result item 1602, a recommended channel item 1603, a recommended related search word item 1604, or a speech recognition result item 1605.

The total search result item 1601 is an item for displaying, as thumbnails, results obtained by searching for a search word on a web browser.

The related video result item 1602 is an item for displaying at least one video related to the search word. For example, the related video result item 1602 may include a video having the largest view counts related to the search word and the latest video related to the search word.

The recommended channel item 1603 may include a channel list related to the search word. The channel list related to the search word may include channels directly related to the search word. Alternatively, the channel list related to the search word may include a channel that broadcasts a program related to the search word.

The recommended related search term item 1604 may indicate at least one word related to the search word. For example, the recommended related search word item 1604 may include words that are frequently searched by other users in relation to the search word.

The speech recognition result item 1605 may include the voice signal recognized by the control unit 170 and a search word found based on the voice signal.

Accordingly, the user may keep viewing the video without interruption while recognizing the searched result. In addition, the user may variously identify desired information through the items.

In addition, the user may view a specific item of the items by magnifying the specific item. In detail, the user may select the specific item from the search result window 1600 using the remote control device 200.

Figure 17:
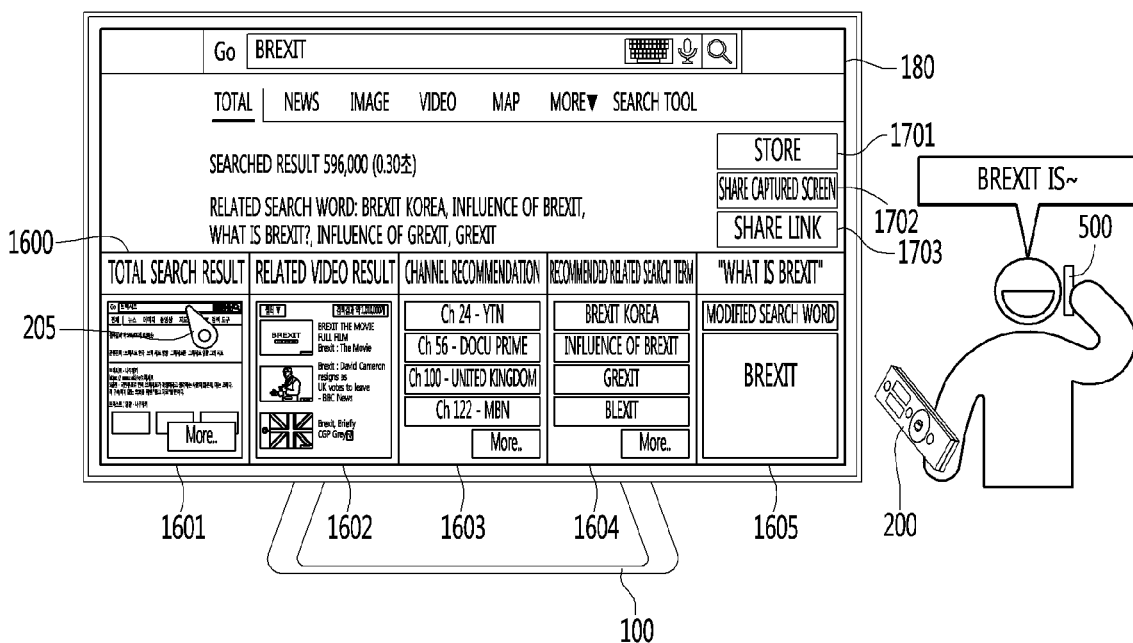

As illustrated in FIG. 17, the control unit 170 may receive a command for selecting any one item from the search result window 1600. The control unit 170 may display content corresponding to the selected item on the remaining area except for the search result window 1600. In other words, the control unit 170 may control the display unit 180 to display the content corresponding to the selected item on an area having the video displayed.

Figure 18:
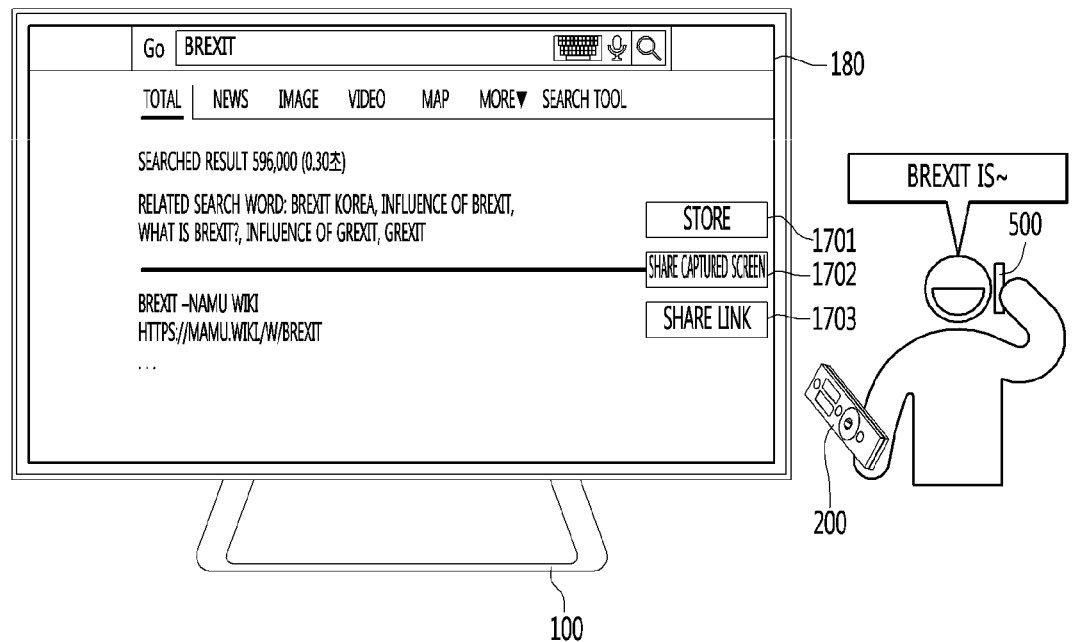

Alternatively, as illustrated in FIG. 18, the control unit 170 may display the content corresponding to the selected item on the entire screen. In detail, the control unit 170 may receive a command for selecting any one item from the search result window 1600. Accordingly, the control unit 170 may control the display unit 180 to display the content corresponding to the selected item on the area where the video and the search result window 1600 are displayed.

As mentioned above, the user may select each item of the search result window 1600 and obtain desired information in detail.

The display unit 180 may display at least one of a storage icon 1701, a captured screen sharing icon 1702, or a link sharing icon 1703 while displaying the searched result.

Figure 19:
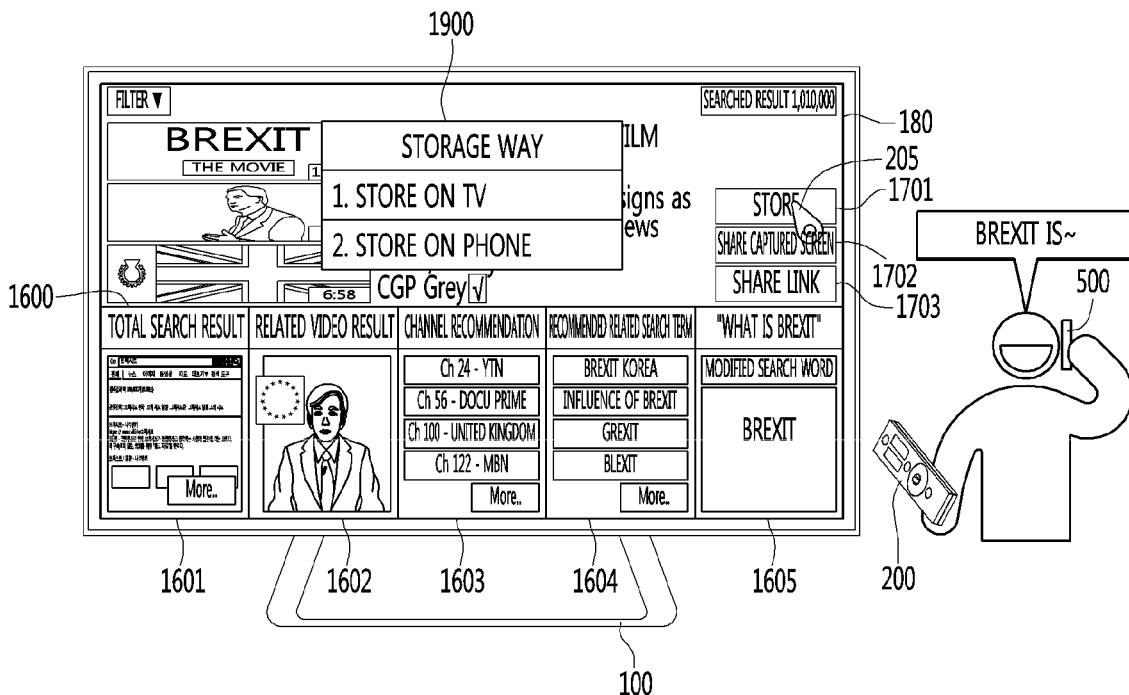

First, the storage icon 1701 will be described with reference to FIG. 19. The storage icon 1701 is an icon for storing the searched result in the display device 100 or the mobile terminal 500. The control unit 170 may perform a control operation to store the searched result in the storage unit 140 of the display device 100 or the memory 170 of the mobile terminal 500 through the storage icon 1701. For example, the control unit 170 may display a storage way menu 1900 when receiving a command for selecting the storage icon 1701 through the pointer 205. The storage way menu 1900 may include an item to be stored in the display device and an item to be stored in the mobile terminal. When receiving a command for selecting any one item from the storage way menu 1900, the control unit 170 may perform a control operation to store the searched result in the display device 100 or the mobile terminal 500 depending on the command.

Figure 20:
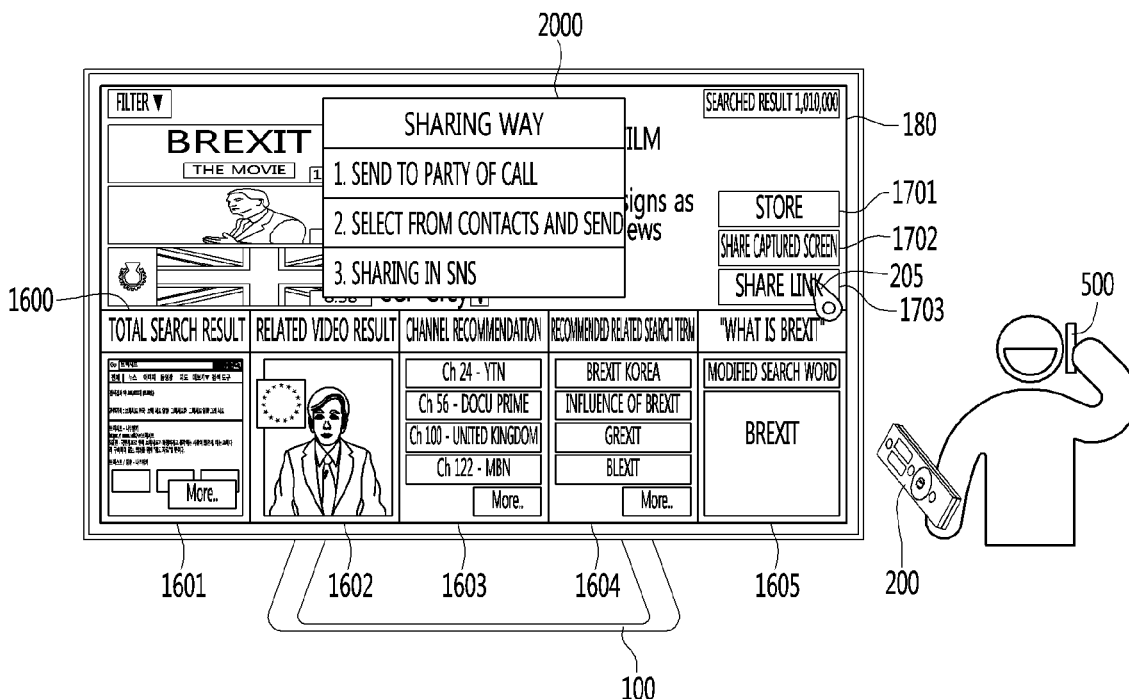
Figure 21:
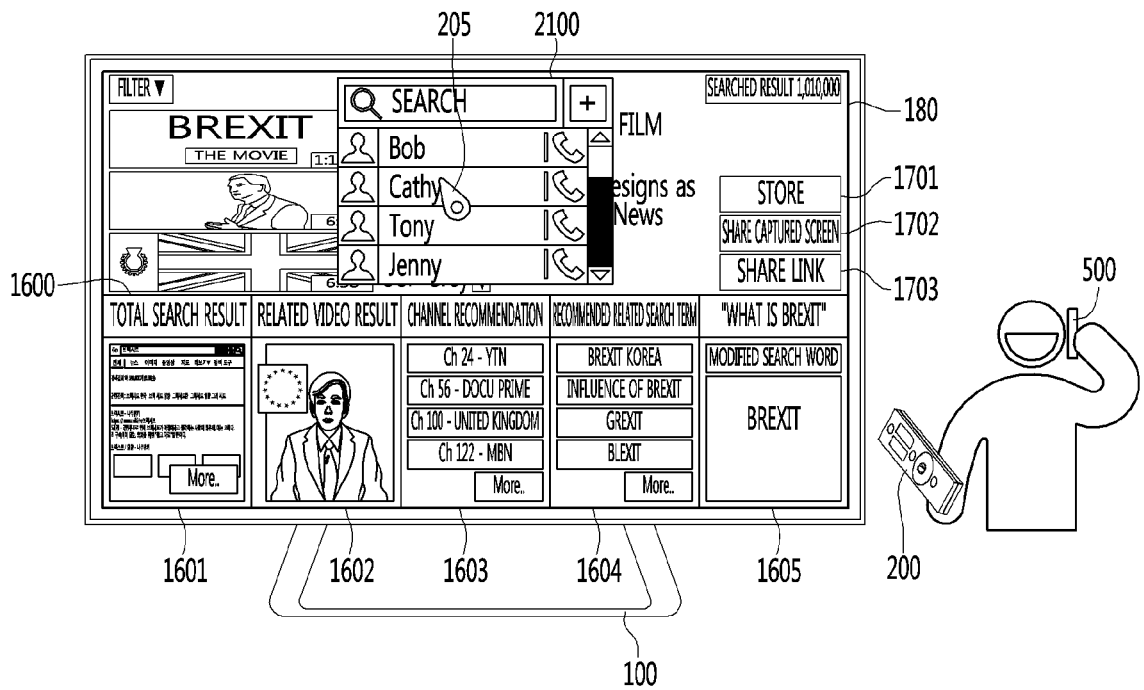
Figure 22:
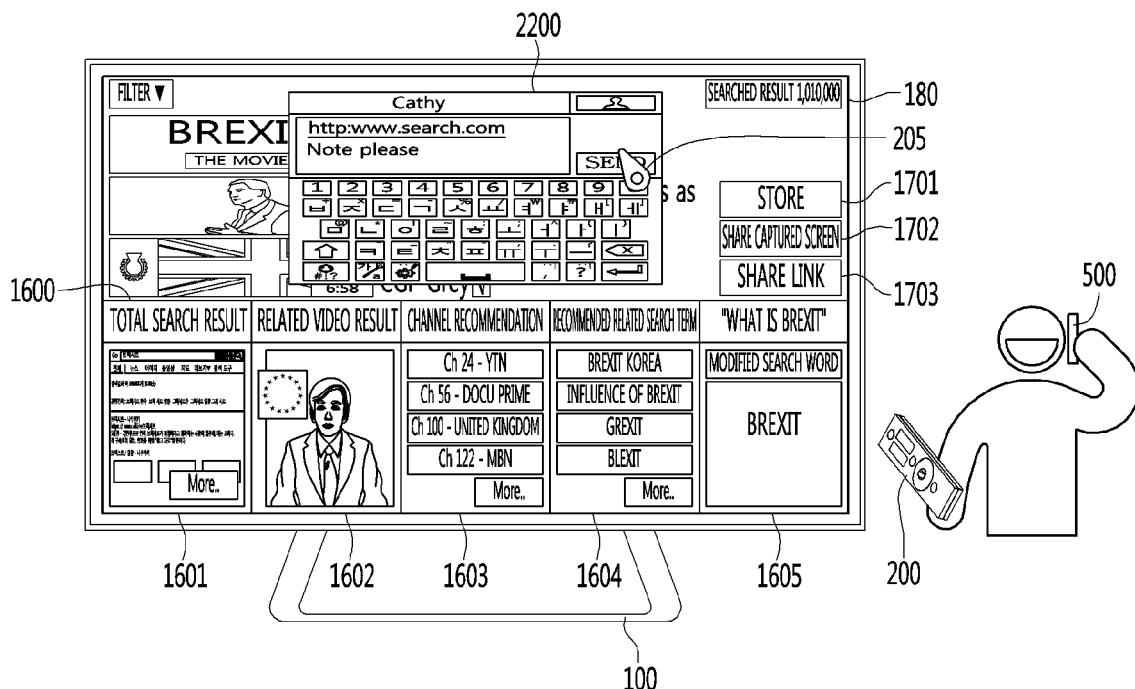

Next, the capture screen sharing icon 1702, and the link sharing icon 1703 will be described with reference to FIGS. 20 to 22. The captured screen sharing icon 1702 is an icon for sharing a search result screen, which is currently displayed on the screen, with another user. The search result screen may be transmitted to another user in the form of an image through the captured screen sharing icon 1702. The link sharing icon 1703 is an icon for transmitting a URL address for viewing the searched result, which is currently displayed on the screen, to another user.

Accordingly, the user may select specific information through the captured screen sharing icon 1702 and transmit the selected information to another user. Alternatively, the user may transmit a link address such that another user may select and view specific information and related information through the link sharing icon 1703.

The following description will be made regarding the sharing way. For example, as illustrated in FIG. 20, the control unit 170 may receive a command for selecting any one of the captured screen sharing icon 1702 and the link sharing icon 1703 through the pointer 205. Accordingly, the control unit 170 may display a sharing way menu 2000.

The sharing way menu 2000 may include an item of "send to the other party", an item of "select from contacts and send", and an item "share in SNS".

The control unit 170 may receive a command for selecting the item of "send to the other party" from the sharing way menu 2000. In this case, the control unit 170 may send a captured screen or a link address to contacts of the other party being currently on a voice all through the mobile terminal 500.

The control unit 170 may receive a command for selecting the item of "select from contacts", from the sharing way menu 2000. In this case, the control unit 170 may control the display unit 180 to display a contact list 2100 stored in the mobile terminal 500 as illustrated in FIG. 21. The control unit 170 may receive contact data from the mobile terminal 500 and display the contact list 2100. The control unit 170 may receive a command for selecting any one of the contact list 2100 through the pointer 205. Accordingly, the control unit 170 may display a sending window 2200 for sending a captured screen or a link address to another user, as illustrated in FIG. 22. The control unit 170 may send the captured screen or the link address to another user through the sending window 2200. In addition, the control unit 170 may send a message through the sending window 2200, in addition to the captured screen or the link address.

Figure 23:
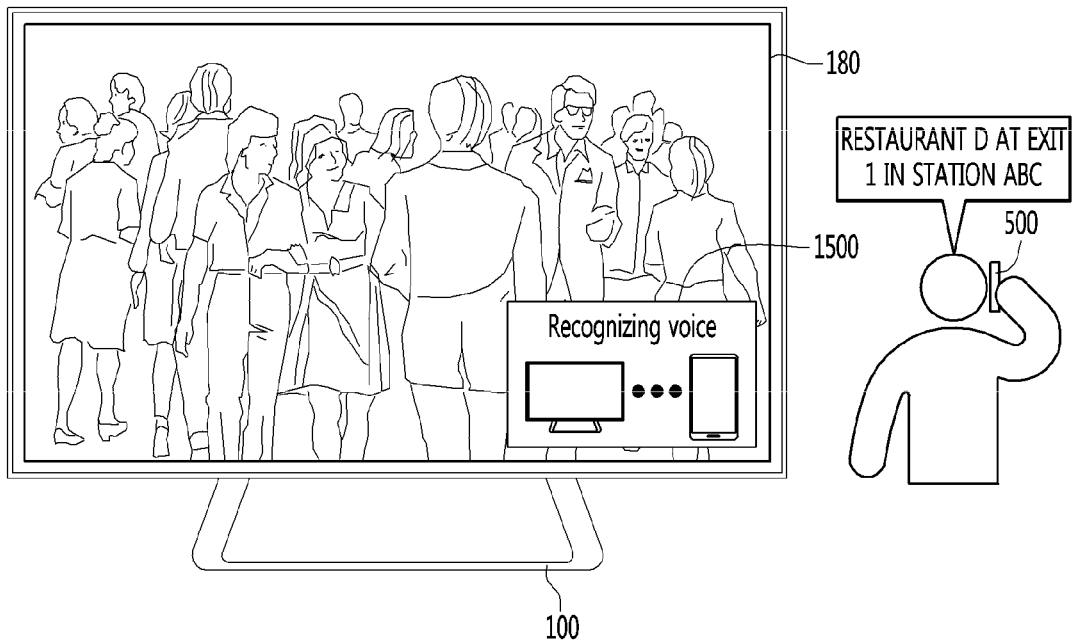
FIGS. 23 and 24 are views illustrating a method that the display device according to the second embodiment of the present invention receives a voice signal and displays the searched result.
Figure 24:
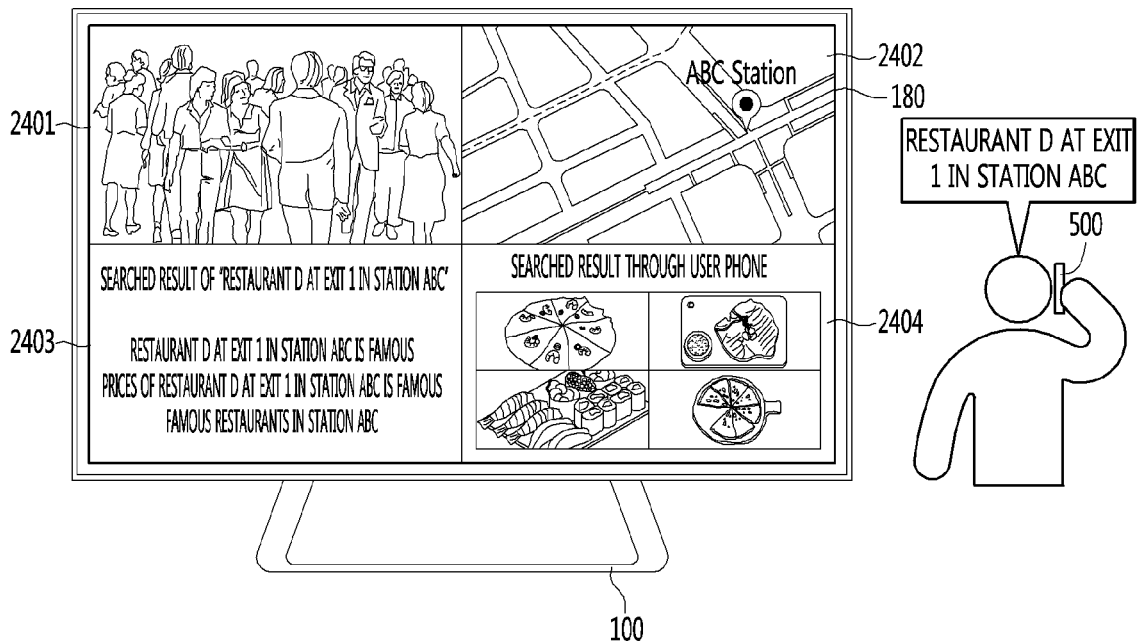

FIGS. 23 and 24 are views illustrating a method that the display device according to the second embodiment of the present invention receives a voice signal and displays the searched result.

The mobile terminal 500 may recognize a voice signal. As mentioned above, the control unit 170 of the display device 100 may receive the voice signal from the mobile terminal 500. The description of the method of recognizing and receiving the voice signal is the same as the method described with reference to FIG. 15. In the example illustrated in FIG. 23, the control unit 170 of the display device 100 may receive a voice signal including "Restaurant D at Exit 1 in Station ABC".

The control unit 170 may obtain a search word by analyzing the received voice signal. The control unit 170 may perform a web search, a map search, and a memory search in the mobile terminal 100 based on the obtained search word. For example, the control unit 170 may search the web, the map, and the mobile terminal 500 for "Restaurant D at Exit 1 in Station ABC".

The control unit 170 may display the searched result on the display unit 180. In detail, as illustrated in FIG. 24, the controller 170 may split the display unit 180 into a plurality of areas, and display searched results in the split areas, respectively. For example, the control unit 170 may split the display unit 180 into a first area 2401 to a fourth area 2404. The control unit 170 may perform a control operation to display a video on the first area 2401, to display a map search result on the second area 2402, may display a web search result on the third area 2403, and to display a searched result from the mobile terminal 500 on the fourth area 2404.

The number of split screens, the way to split the screen, and content (a video or a searched result) to be displayed on each area may be set by default or may be arbitrarily set by a user.

Figure 25:
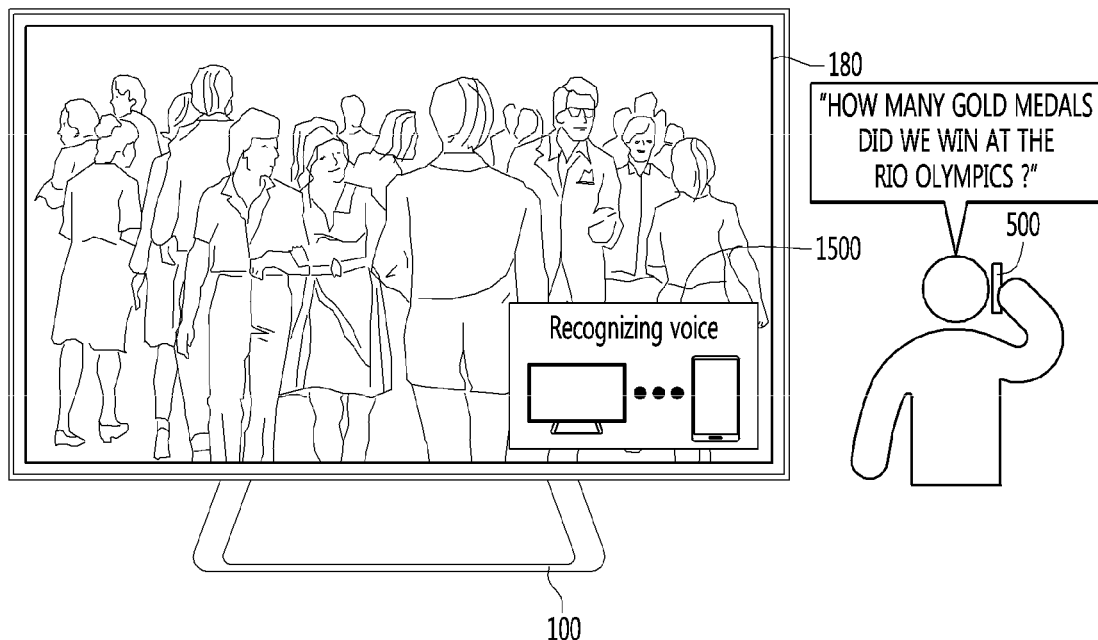
FIGS. 25 and 26 are views illustrating a method that the display device according to the third embodiment of the present invention receives a voice signal and displays the searched result.
Figure 26:
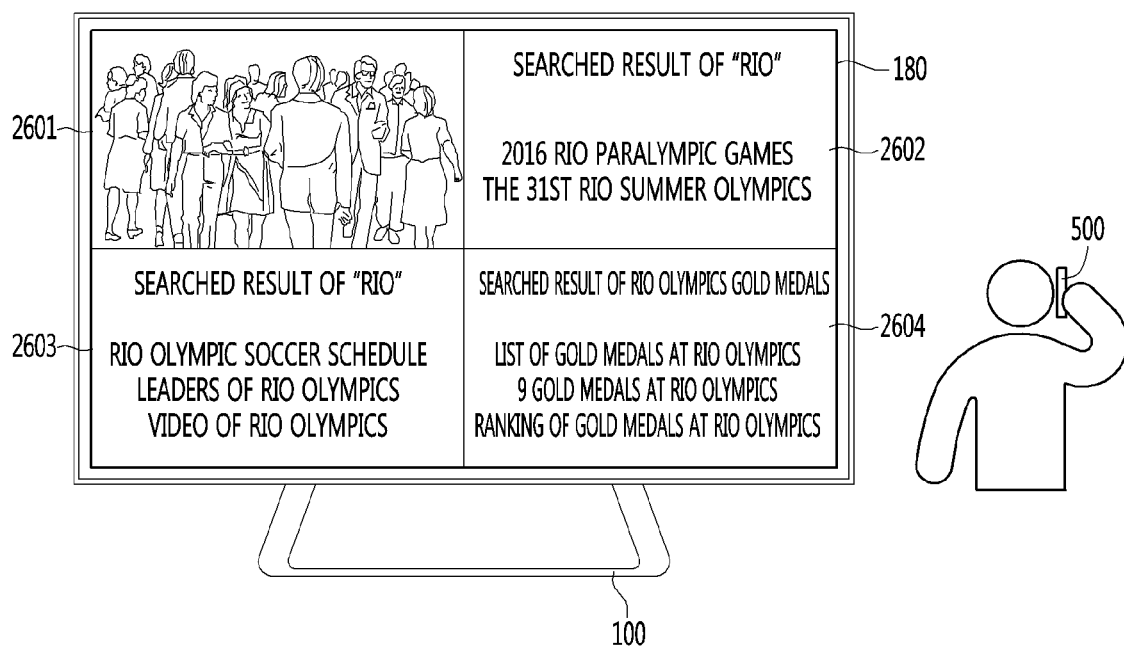

FIGS. 25 and 26 are views illustrating a method that the display device according to the third embodiment of the present invention receives a voice signal and displays the searched result.

The mobile terminal 500 may recognize a voice signal. As mentioned above, the control unit 170 of the display device 100 may receive the voice signal from the mobile terminal 500. The description of the method of recognizing and receiving the voice signal is the same as the method described with reference to FIG. 15. In the example illustrated in FIG. 25, the control unit 170 of the display device 100 may receive a voice signal including "How many gold medals did we win at the Rio Olympics?".

The control unit 170 may obtain a search word by analyzing the received voice signal. In detail, the control unit 170 may obtain at least one word included in the voice signal, as the search word. The control unit 170 may search for the at least one word, which is obtained, individually or the combinations of the at least one word. For example, when the control unit 170 receives a voice signal of "How many gold medals did we win at the Rio Olympics?", the control unit 170 may obtain words of 'Rio', 'Olympics' and 'gold medals' as search words. The control unit 170 may search for each of words of 'Rio', 'Olympics' and 'gold medal' individually. In addition, the control unit 170 may search for "Rio Olympics" and "Gold medals at the Rio Olympics".

The control unit 170 may perform a control operation such that the search result screen is displayed on the display unit 180 as illustrated in FIG. 26. For example, the control unit 170 may split the display unit 180 into a first area 2601 to a fourth area 2604. The control unit 170 may display the video on the first area 2601, to display the searched result for 'Rio' on the second area 2602, to display the searched result for 'Rio Olympics' on the third area 2603, and to display the searched result for "Gold medals at the Rio Olympics" on the fourth area 2604. In other words, the control unit 170 may display the video and searched results for the search words on the split areas, respectively. Alternatively, the control unit 170 may display only searched results for the search words on the split areas. The searched result displayed on each area may be a searched result having the largest search counts in relation to the received voice signal.

Figure 27:
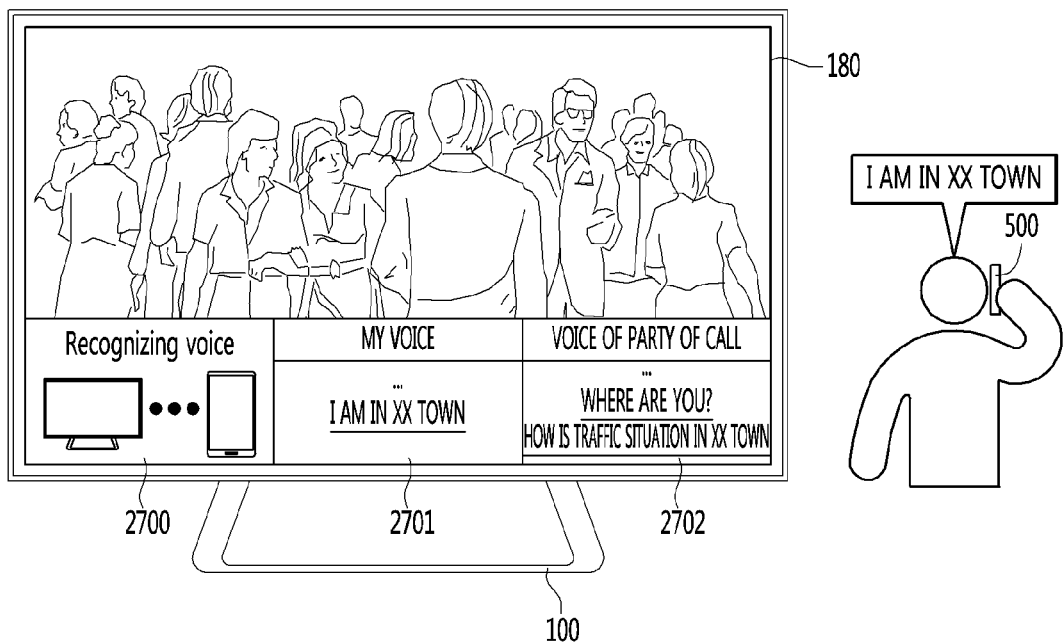
FIGS. 27 to 29 are views illustrating a method that the display device according to the fourth embodiment of the present invention receives a voice signal and displays the searched result.
Figure 28:
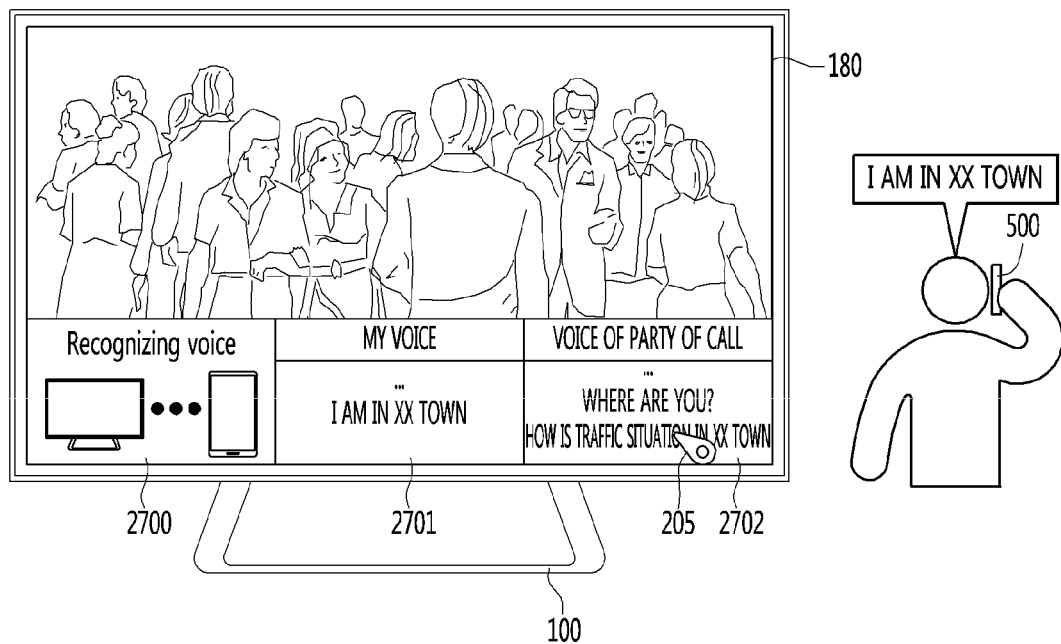
Figure 29:
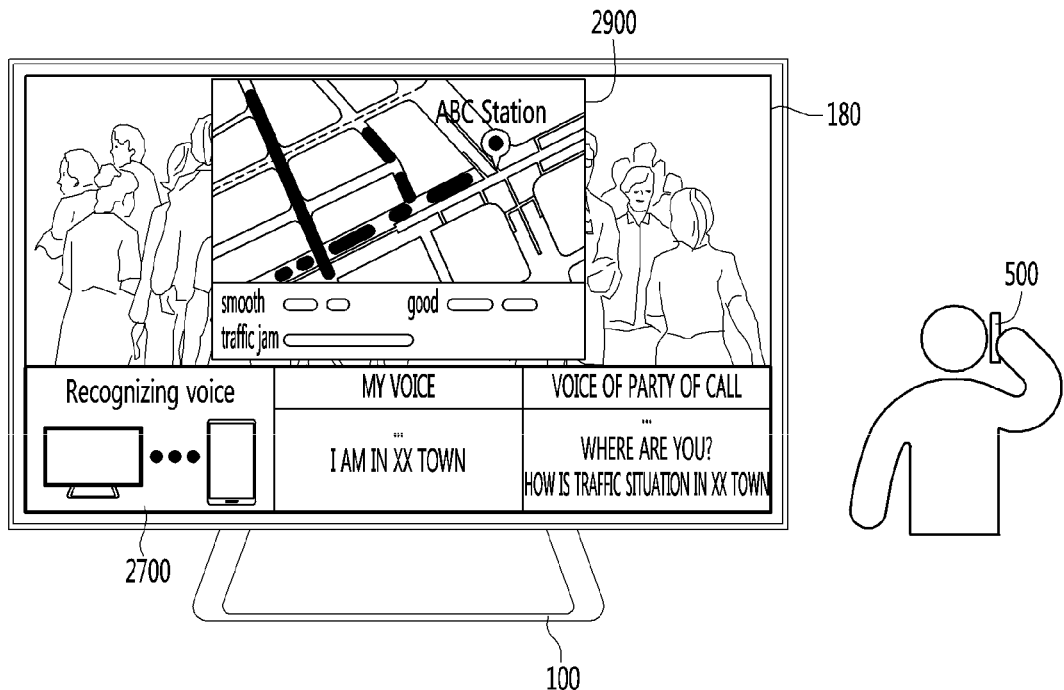

FIGS. 27 to 29 are views illustrating a method that the display device according to the fourth embodiment of the present invention receives a voice signal and displays the searched result.

The control unit 570 of the mobile terminal 500 may recognize a voice signal of the calling party together with a voice signal of the user. The mobile terminal 500 may send the voice signal of the user and the voice signal of the calling party to the display device 100.

The control unit 170 of the mobile terminal 100 may receive the voice signal of the calling party together with the voice signal of the user. The control unit 170 may control the display unit 180 to display the received voice signal on the display unit 180.

For example, as illustrated in FIG. 27, the control unit 170 may perform a control operation to display a voice signal window 2700. The voice signal window 2700 is a window for displaying the conversation between the user and the calling party in the form of a caption. Accordingly, the control unit 170 may analyze the voice signal of the user and the voice signal of the calling party to display a user voice 2701 and another party's voice 2702 on the voice signal window 2700. The user may visually view the conversation between the user and the calling party through the voice signal window 2700.

In addition, the user may search for specific information through the voice signal window 2700. In detail, as illustrated in FIG. 28, the user may search for any one caption displayed on the voice signal window 2700. The control unit 170 may receive a command for selecting any one of at least one caption displayed on the voice signal window 2700 through the pointer 205. The control unit 170 may obtain a search word from the selected caption and perform a search. For example, the control unit 170 may extract at least one noun from the selected caption and obtain the extracted noun as a search word.

As illustrated in FIG. 29, the control unit 170 may control the display unit 180 to display a searched result. For example, the control unit 170 may receive a command for selecting the caption of "What is the traffic situation at XX town like?". Accordingly, the control unit 170 may obtain a word of 'XX town' or 'traffic situation' as a search word. The control unit 170 may display a searched result obtained by using the obtained word of 'XX town' or 'traffic situation' on the pop-up window 2900. When the control unit 170 receives a command for selecting another caption in the state that the pop-up window 2900 is displayed, the control unit 170 may display the searched result corresponding to the command on the pop-up window 2900.

The user has the effect of instantly searching for specific information during the conversation, while visually viewing the conversation with the other party as mentioned above.

The display device 100 according to the present invention may display results searched by receiving the voice signal as described according to the first embodiment to the fourth embodiment. However, this is provided only for the illustrative purpose, and the display device 100 may display the searched result by receiving the voice signal through another method.

The display device 100 may store the searched result in the storage unit 140. The user may view the stored searched result thereafter.

Figure 30:
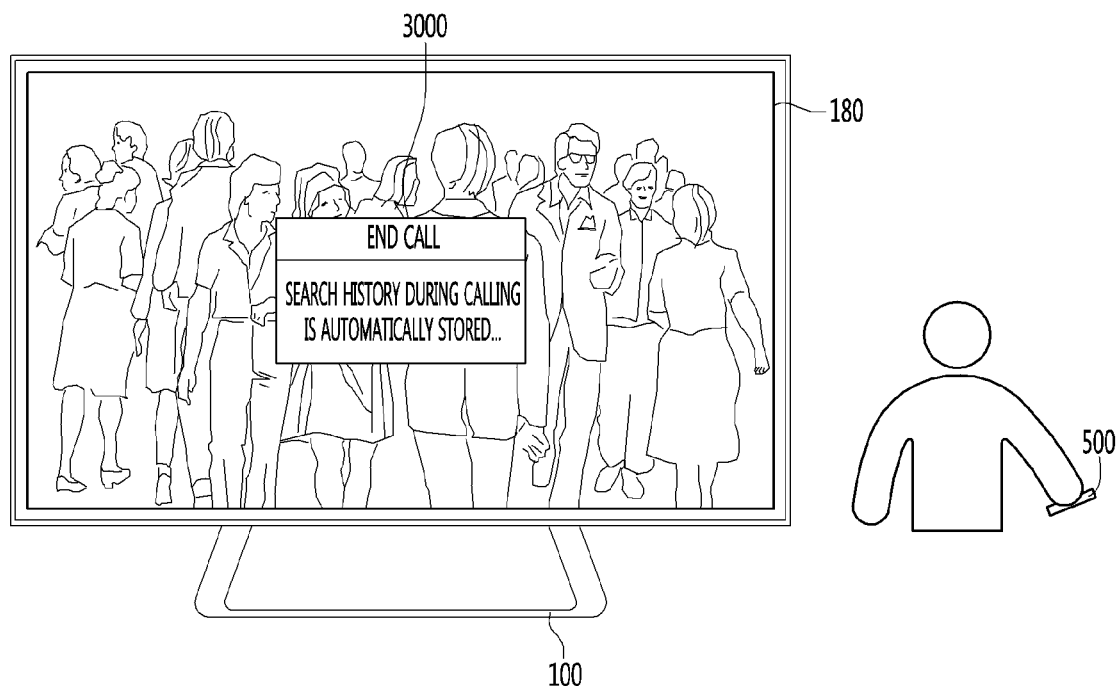
FIGS. 30 to 32 are views illustrating a method that the display device stores and displays the searched result after terminating the call according to an embodiment of the present invention.
Figure 31:
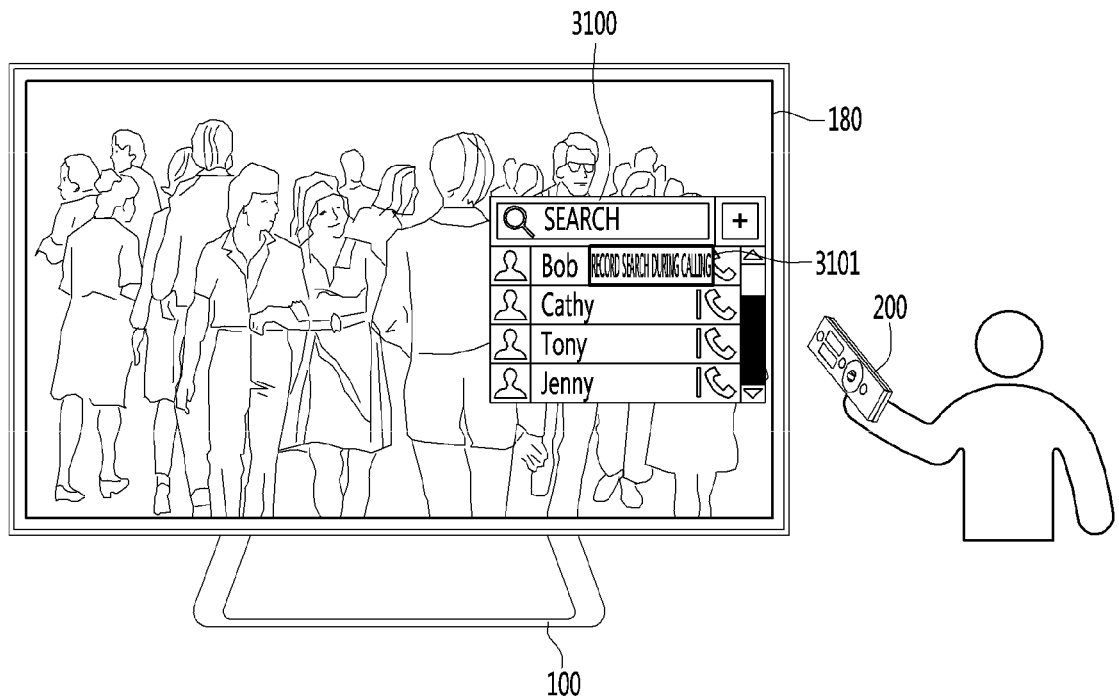
Figure 32:
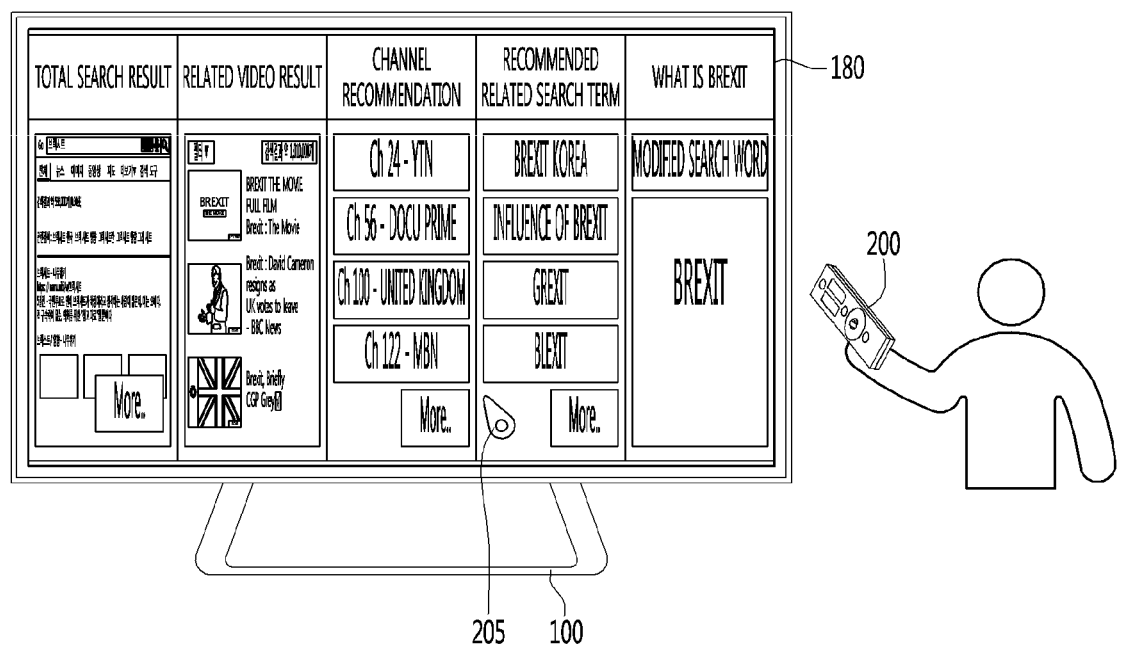

Hereinafter, a method for storing and displaying the searched result according to an embodiment of the present invention will be described with reference to FIGS. 30 to 32. FIGS. 30 to 32 are views illustrating a method that the display device stores and displays the searched result after terminating the call according to an embodiment of the present invention.

The control unit 170 of the display device 100 may perform a control operation to automatically store a searched result after receiving a voice signal, performing a search, and terminating a call. As illustrated in FIG. 30, the control unit 170 may store the searched result while displaying a storage notification window 3000. In addition, the control unit 170 may perform a control operation to display a window for asking a user whether to store the searched result. Alternatively, the control unit 170 may display a window for asking the user whether to store the searched result in the display device 100 or the mobile terminal 500.

The control unit 170 may store the searched result in the storage unit 140 by matching the searched result with the calling party. Accordingly, as illustrated in FIG. 31, the control unit 170 may display contacts of the other party and a search result icon 3101 corresponding to the contacts, when displaying a contact list 3100.

The control unit 170 may receive a command for selecting the search result icon 3101 through the pointer 205. In this case, the control unit 170 may display a window for the past searched results associated with the contacts corresponding to the selected search result icon 3101 as illustrated in FIG. 32.

The user has an effect of checking the past searched results through the displayed search result window.

As mentioned above, the user may conveniently search for, store, and check specific information by using the display device 100 while making a voice call.

According to an embodiment of the present invention, the above-described method is implemented as code that can be written to a processor-readable recording medium and can thus be read by a processor. Examples of the processor-readable recording medium include a ROM, a RAM, a CD-ROM, a magnetic tape, a floppy disk and an optical data storage.

The display device according to the present invention should not be limited to configurations and methods of the above-described embodiments, and all or some of the embodiments may be selectively combined with one another to achieve various alterations.

What is claimed is:

1. A display device comprising:
a display unit;
a short-range communication unit configured to communicate with a mobile terminal; and
a control unit configured to:
receive, through the short-range communication unit, a search request signal from the mobile terminal,
receive, through the short-range communication unit, a voice signal from the mobile terminal after receiving the search request signal, and
display, on the display unit, a search result based on the voice signal,
wherein the control unit is further configured to:
receive a power control command generated based on a preset voice signal while a power of the display device is turned off,
turn on the power of the display device in response to the received power control command, and
display, on the display unit, a window indicating that voice search is possible according to turning on the power of the display device.

2. The display device of claim 1, further comprising:
a storage unit to store a search result based on the voice signal.

3. The display device of claim 1, wherein the short-range communication unit transmits a search result to the mobile terminal.

4. The display device of claim 1, wherein the display unit displays a sharing menu including an item for transmitting to a calling party and an item for transmitting to a selected person from contacts, and
wherein the short-range communication unit transmits a search result to the mobile terminal of the calling party or a mobile terminal of the selected person from the contacts, based on a selected item from the sharing menu.

5. The display device of claim 1,
wherein the control unit obtains at least one search word by analyzing the voice signal, and
wherein the display unit displays a search result based on the at least one search word.

6. The display device of claim 5, wherein the control unit performs a web-browser search, a map search or a search on the mobile terminal by using the search word.

7. The display device of claim 4, wherein the control unit performs, when a plurality of search words are obtained, a search using each of the plurality of search words and a search using combination of the plurality of search words.

8. The display device of claim 7, wherein the control unit splits a screen displayed on the display unit into a plurality of areas and displays a search result on the plurality of areas that are split.

9. The display device of claim 6, wherein the control unit splits a screen displayed on the display unit into four areas and displays a video which is being viewed, a result of the web-browser search, a result of the map search, and a result of the search on the mobile terminal on the split areas.

10. The display device of claim 1, wherein the display unit displays a user voice signal and a voice signal of a calling party as captions, and displays a search result based on a selected caption when receiving a command for selecting any one of the captions.

11. The display device of claim 2, wherein the storage unit automatically stores a search result when a call on the mobile terminal is terminated.

12. The display device of claim 11, wherein the storage unit stores the search result by matching the search result with a calling party.

13. The display device of claim 1, wherein the search request signal is a voice signal including a preset keyword.

14. The display device of claim 13, wherein the preset keyword is set by default or arbitrarily set through a user input.

15. The display device of claim 1,
wherein the control unit receives the voice signal from the mobile terminal if in the display device is in a connected state with the mobile terminal.

16. The display device of claim 15, wherein the short-range communication unit transmits a request signal for Bluetooth Low Energy (BLE) connection to the mobile terminal if the display device is not in the connected state with the mobile terminal.

17. The display device of claim 16, wherein the control unit transmits the request signal for the BLE connection to the mobile terminal in response to receiving a command for selecting one button provided in a remote control device.

18. The display device of claim 1, further comprising:
a camera
wherein the control unit to recognizes that the search request signal has been received if the camera senses a user facing a direction of the display device for a preset time.

19. The display device of claim 1, wherein the display unit displays a screen corresponding to a search mode when the power of the display device is on and Bluetooth Low Energy (BLE) connection to the mobile is on.

20. The display device of claim 1, wherein the control unit receives the voice signal from the mobile terminal while a button of the mobile terminal is selected.

\* \* \* \* \*